US012609327B2

(12) United States Patent
Rong et al.

(10) Patent No.: US 12,609,327 B2
(45) Date of Patent: Apr. 21, 2026

(54) CARBON-SUPPORTED PLATINUM GROUP METAL CATALYST, PREPARATION METHOD THEREFOR AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Junfeng Rong, Beijing (CN); Hong Zhao, Beijing (CN); Nanhong Xie, Beijing (CN); Jiakang Zhang, Beijing (CN); Qian Peng, Beijing (CN); Houpeng Wang, Beijing (CN); Xianrui Gu, Beijing (CN); Yunge Zhang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 526 days.

(21) Appl. No.: 18/043,310

(22) PCT Filed: Aug. 26, 2021

(86) PCT No.: PCT/CN2021/114752
§ 371 (c)(1),
(2) Date: Feb. 27, 2023

(87) PCT Pub. No.: WO2022/042640
PCT Pub. Date: Mar. 3, 2022

(65) Prior Publication Data
US 2023/0369609 A1 Nov. 16, 2023

(30) Foreign Application Priority Data

Aug. 27, 2020 (CN) .......................... 202010877409.7
Aug. 27, 2020 (CN) .......................... 202010877417.1
Sep. 24, 2020 (CN) .......................... 202011012719.9

(51) Int. Cl.
*H01M 4/92* (2006.01)
*H01M 4/88* (2006.01)

(52) U.S. Cl.
CPC ......... *H01M 4/926* (2013.01); *H01M 4/8817* (2013.01)

(58) Field of Classification Search
CPC ........ H01M 4/92; H01M 4/88; H01M 4/9083; H01M 4/926; H01M 2008/1095
See application file for complete search history.

(56) References Cited

U.S. PATENT DOCUMENTS

2012/0295137 A1 11/2012 Ozkan et al.
2013/0288155 A1 10/2013 Kim et al.

FOREIGN PATENT DOCUMENTS

CN 103372467 A 10/2013
CN 104258892 A 1/2015
(Continued)

OTHER PUBLICATIONS

Tachibana et al. Platinum Carrier and Oxygen Reduction Catalyst Using the Same and Method for Producing the Same, and Fuel Cell and Metal Air Cell, Mar. 2018. See the Abstract. (Year: 2018).*
(Continued)

*Primary Examiner* — Tiffany Legette
*Assistant Examiner* — Monique M Wills
(74) *Attorney, Agent, or Firm* — NKL Law; Allen Xue

(57) ABSTRACT
A platinum-carbon catalyst, a preparation method therefor and an application thereof are provided. Among $N_{1s}$ spectral peaks of the XPS analysis of the platinum-carbon catalyst,
(Continued)

except for the presence of characteristic peaks between 399 ev and 400.5 ev, there are no other characteristic peaks between 395 ev and 405 ev; and a carrier of the platinum-carbon catalyst is nitrogen doped conductive carbon black. The carrier conductive carbon black of the platinum-carbon catalyst is modified, and by means of controlling the doping form of a doping element, the mass specific activity and electrochemical area of the platinum-carbon catalyst are significantly improved; further, the stability of the platinum-carbon catalyst and the ability to resist carbon corrosion may also be improved. A method for preparing the platinum-carbon catalyst is also provided.

16 Claims, 12 Drawing Sheets

(56) References Cited

FOREIGN PATENT DOCUMENTS

| CN | 105417532 | A |   | 3/2016 |   |   |
| CN | 107413331 | A |   | 12/2017 |   |   |
| CN | 109103473 | A |   | 12/2018 |   |   |
| CN | 109273732 | A |   | 1/2019 |   |   |
| CN | 109962246 | A |   | 7/2019 |   |   |
| CN | 110247063 | A |   | 9/2019 |   |   |
| JP | 2007061698 | A | * | 3/2007 |   |   |
| JP | 2013530039 | A |   | 7/2013 |   |   |
| JP | 2018034138 | A | * | 3/2018 |   |   |
| KR | 20200101001 | A | * | 8/2020 | ............ | H01M 12/08 |

OTHER PUBLICATIONS

Suzuki et al. Electrode Catalyst for Fuel Cell, Membrane Electrode Assembly, Fuel Cell and Portable Electronic Equipment, Mar. 2007. See the Abstract. (Year: 2007).*

Park Electrochemical Catalyst For Oxygen Reduction Reaction Using Carbon Black And Method For Producing The Same, Aug. 2020. See the Abstract. (Year: 2020).*

Ghanashyam, Gyawali et al., "Synthesis of nitrogen-doped plasma treated graphite for supercapacitor applications", Chemical Physics Letters, vol. 725, Jun. 16, 2019, pp. 31-37.

"Evaluation of the displacement position of nitrogen in nitrogen-doped carbon materials such as fuel cells", Analysis Case C0484, 2017, p. 1.

* cited by examiner

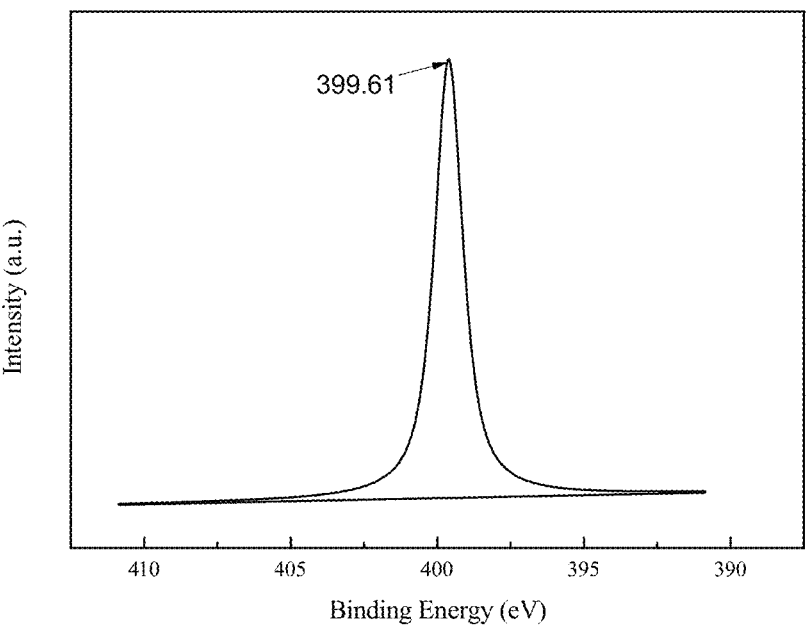
FIG. I-1
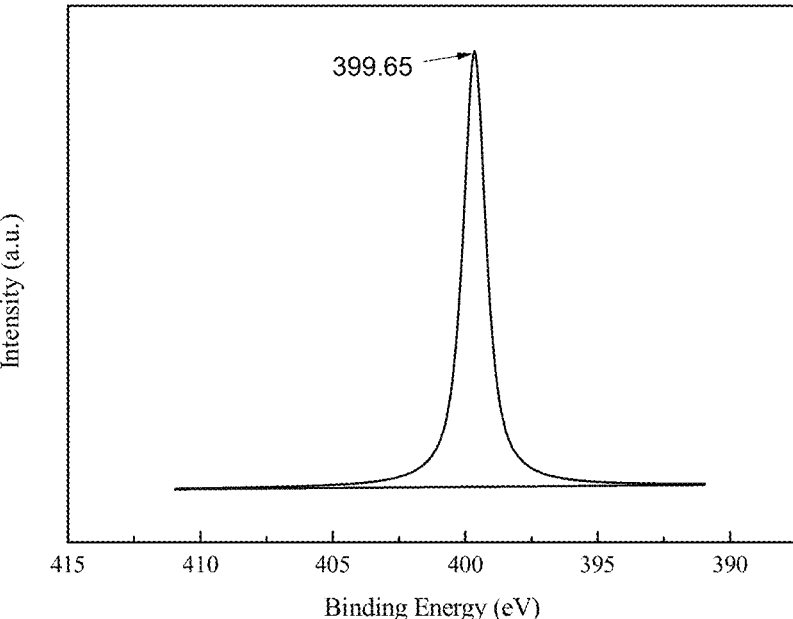
FIG. I-2

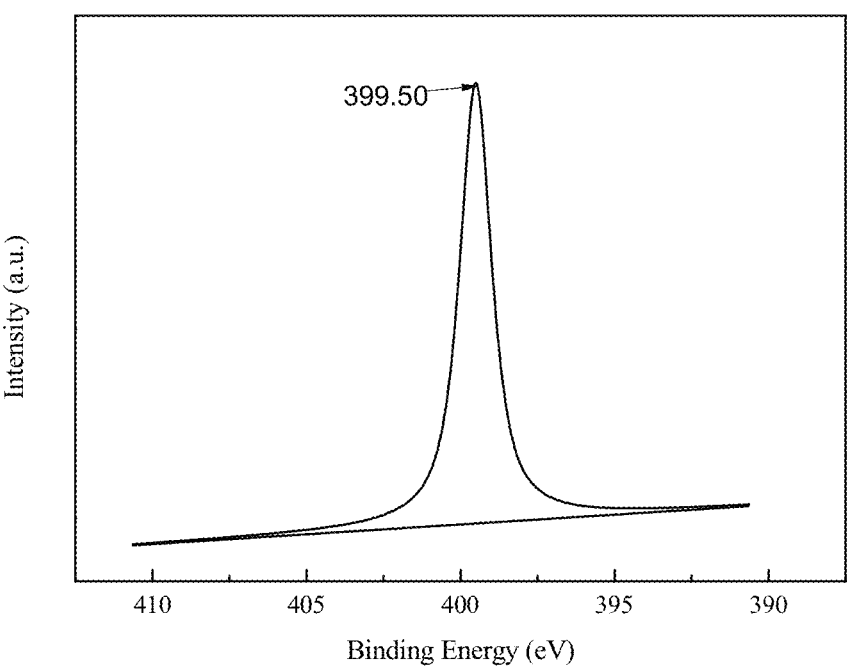
FIG. I-3
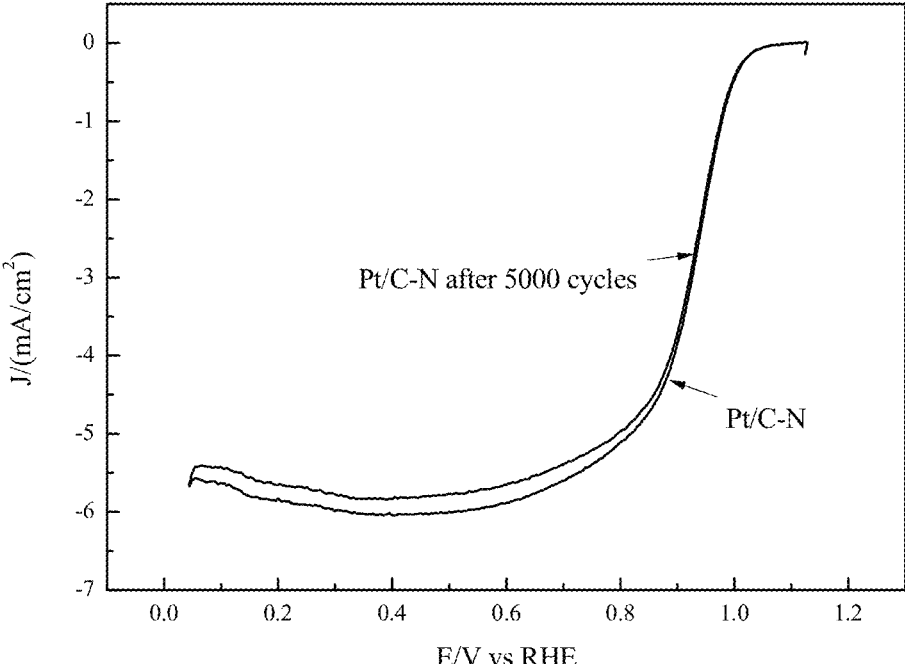
FIG. I-4

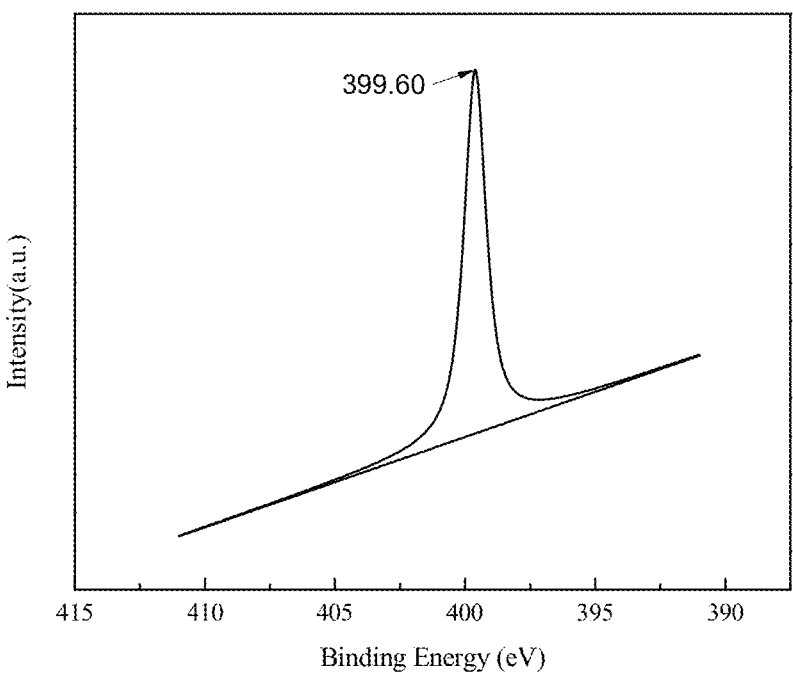
FIG. I-5
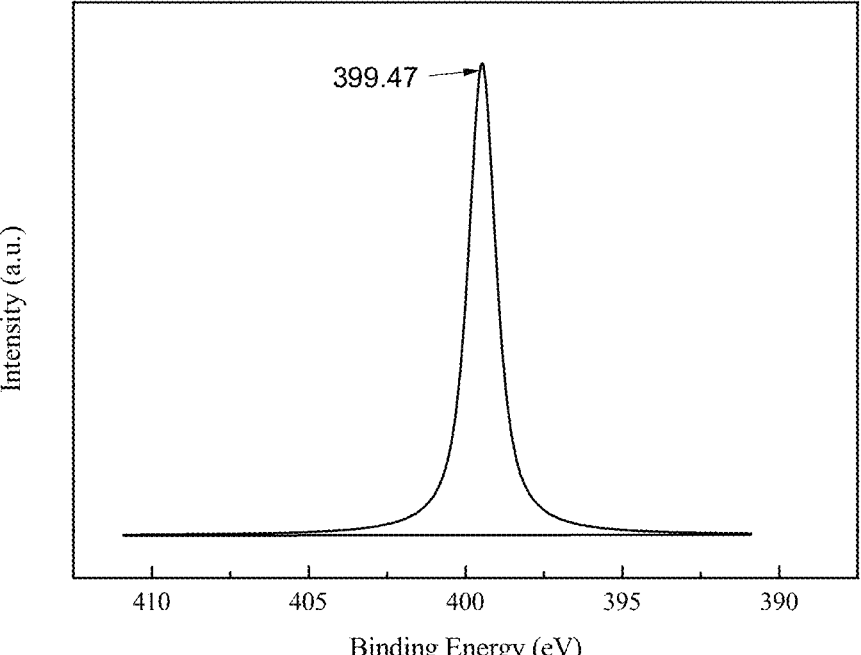
FIG. I-6

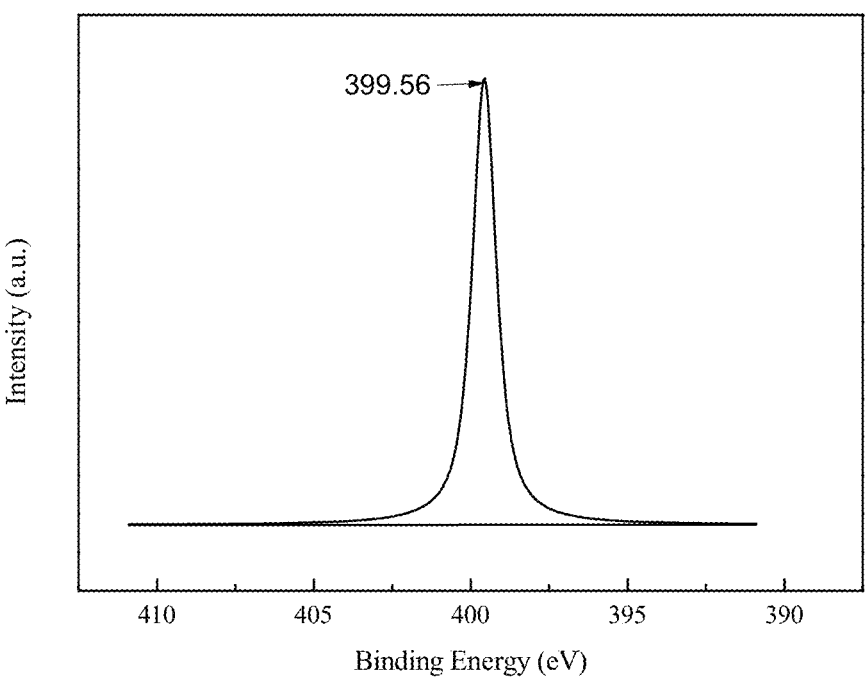
FIG. I-7
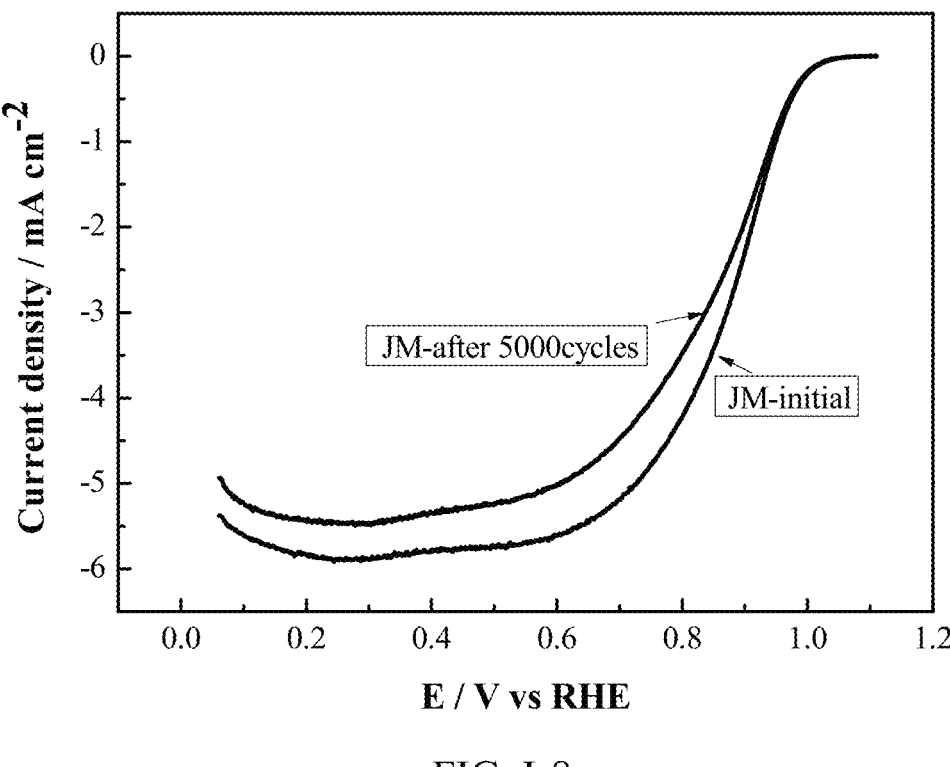
FIG. I-8

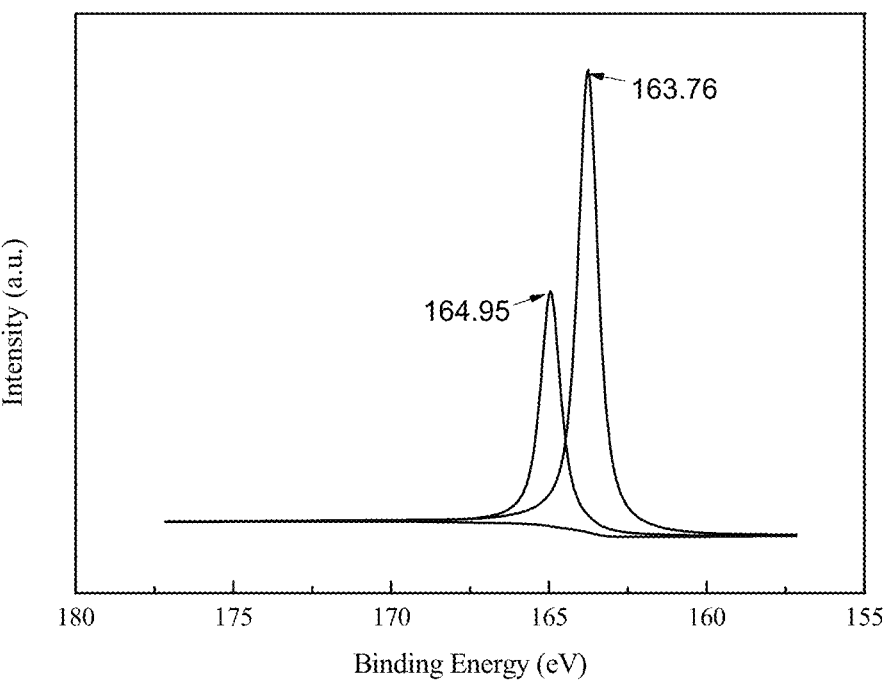
FIG. II-1
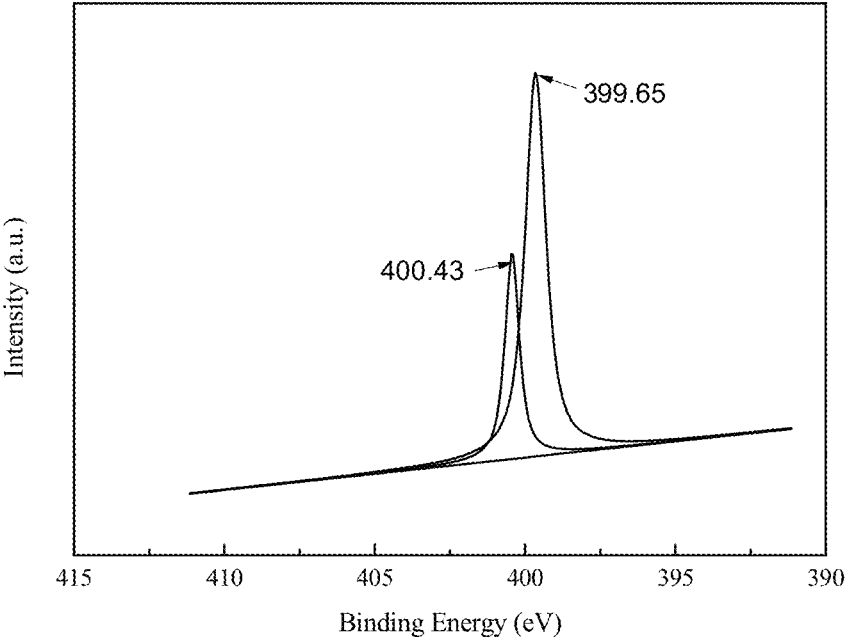
FIG. II-2

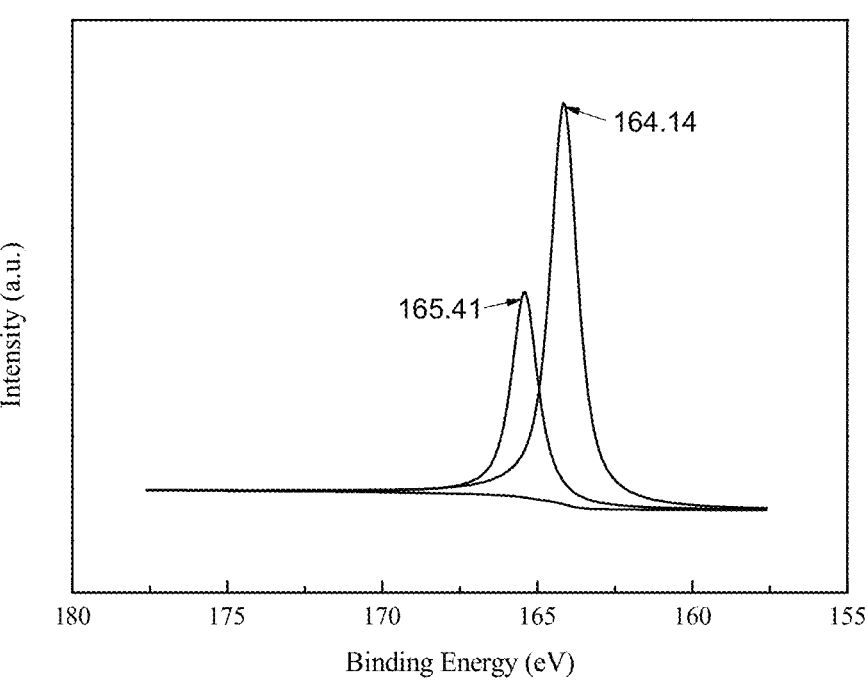
FIG. II-3
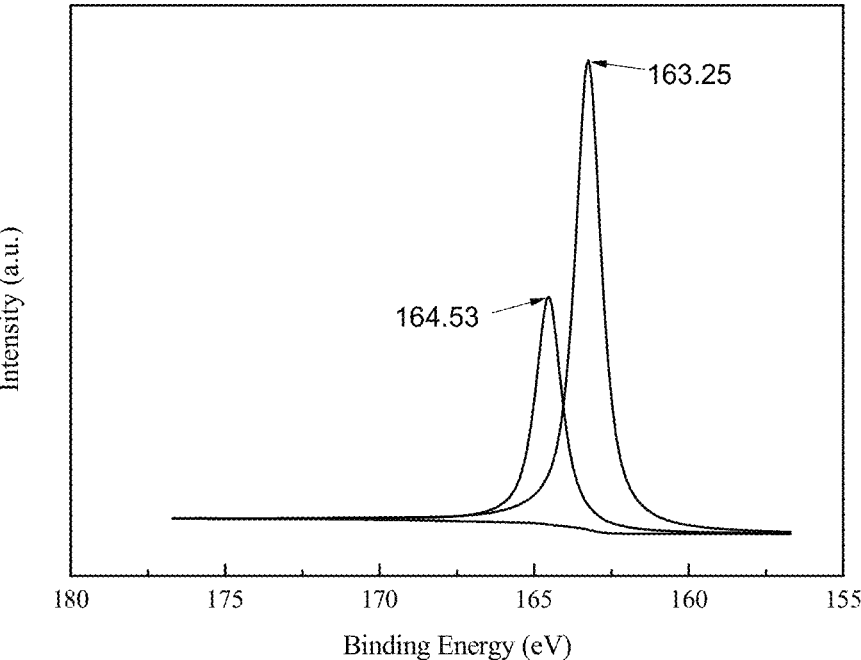
FIG. II-4

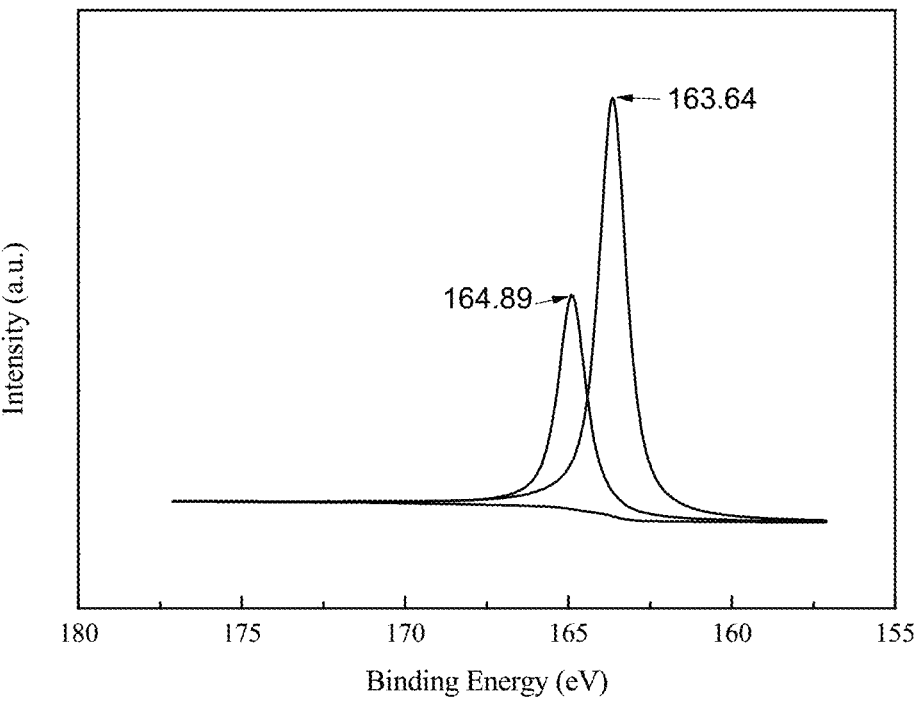
FIG. II-5
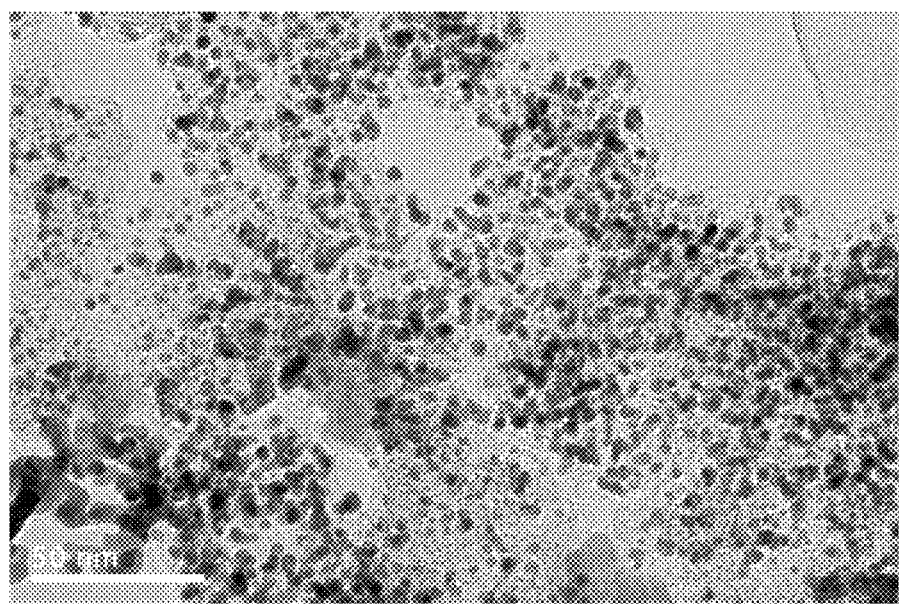
FIG. II-6

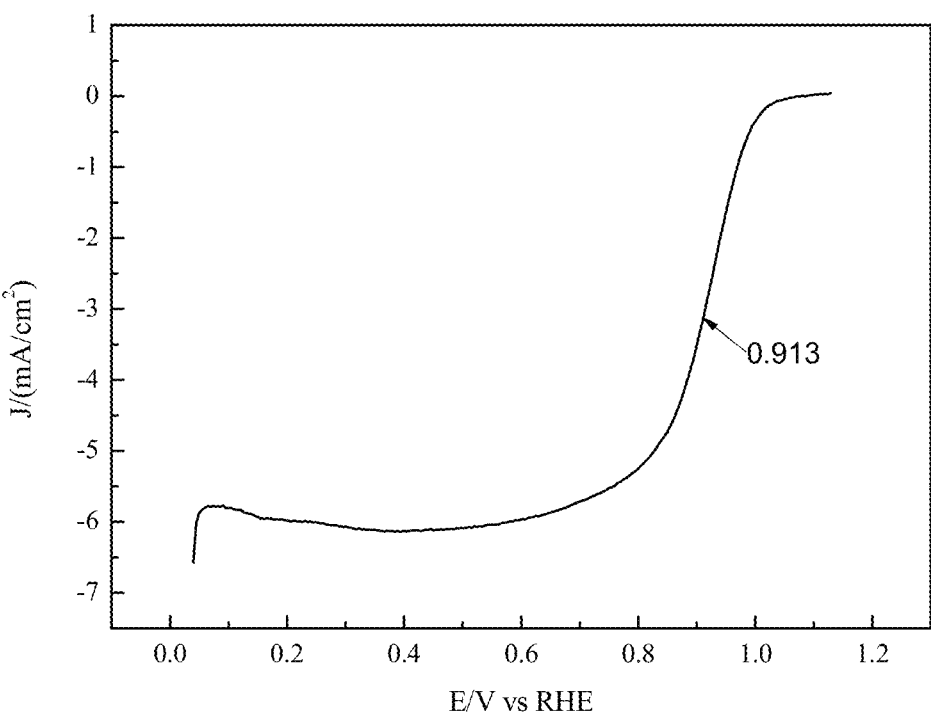
FIG. II-7
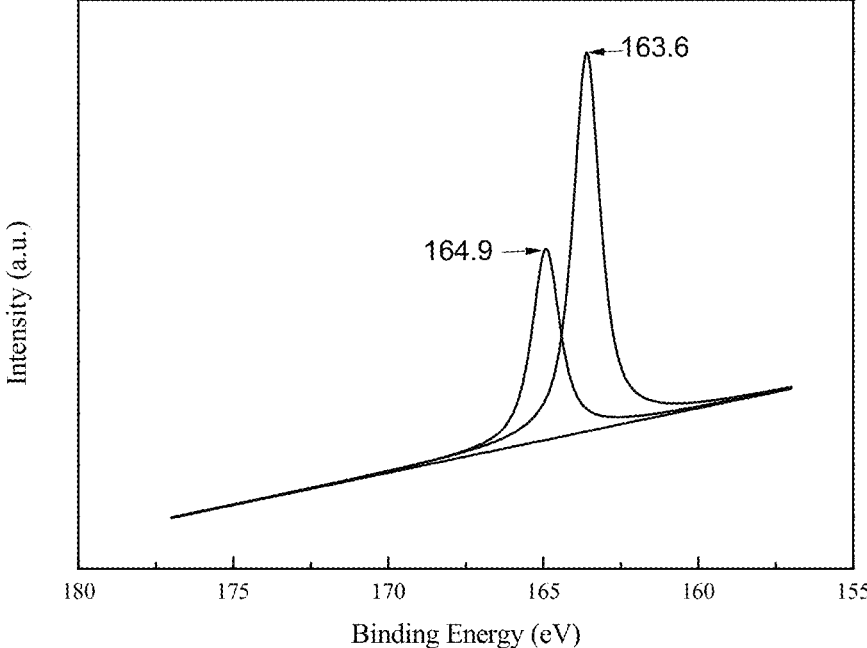
FIG. II-8

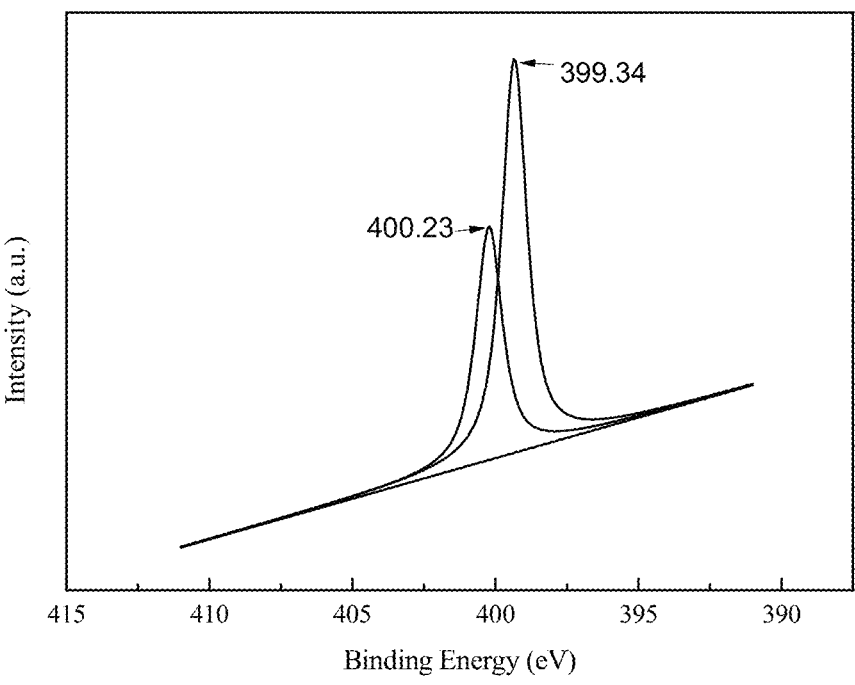
FIG. II-9
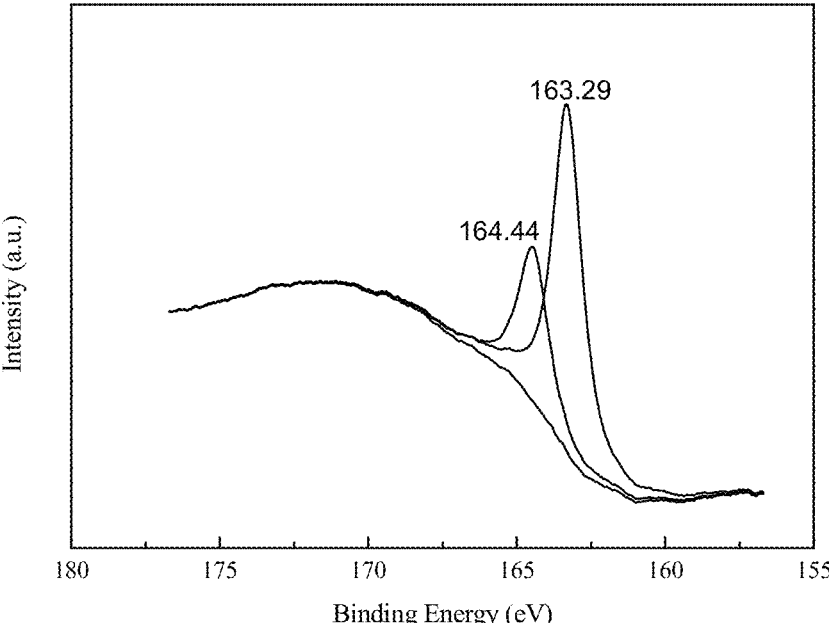
FIG. II-10

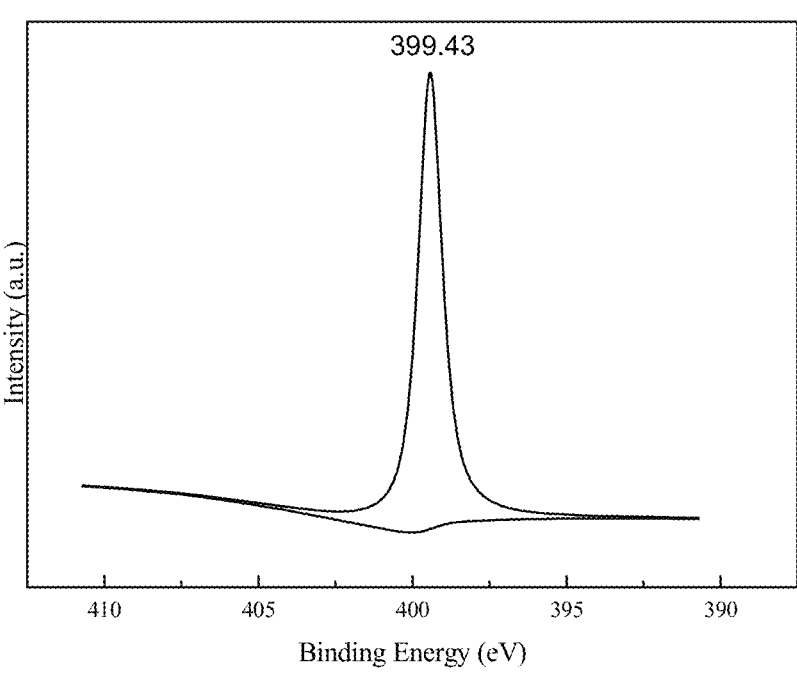
FIG. II-11
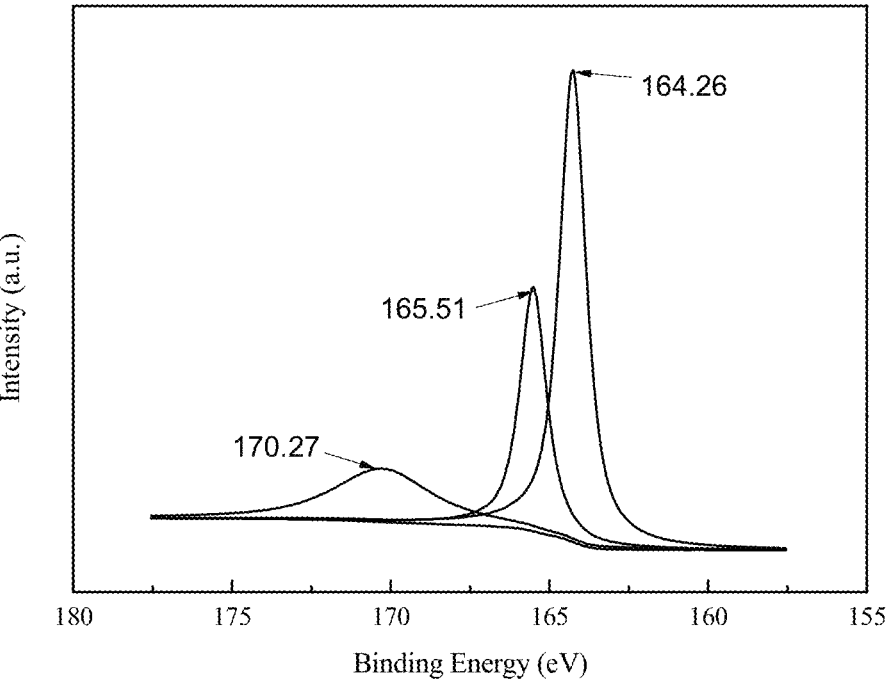
FIG. II-12

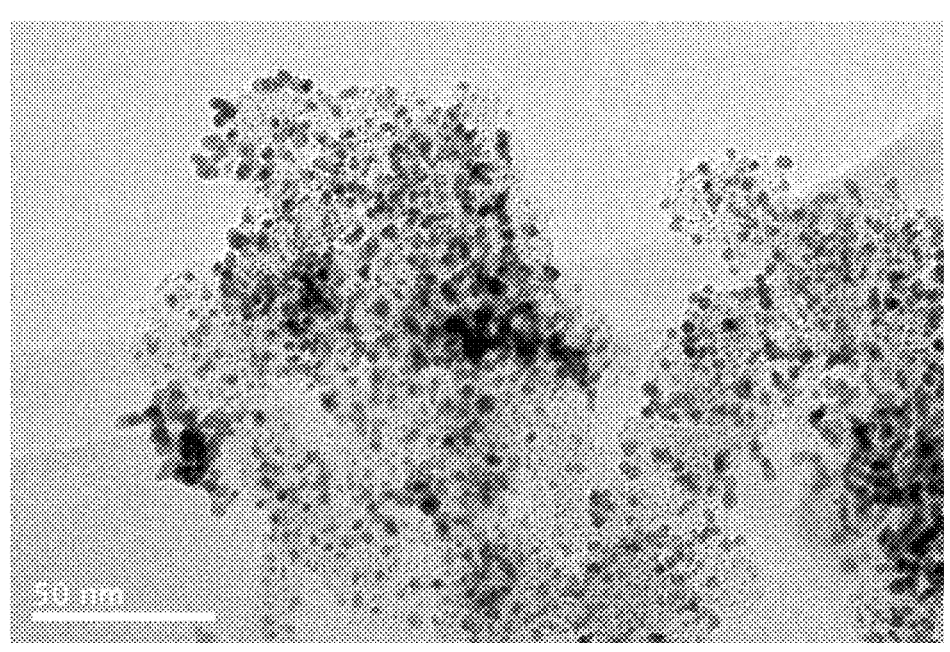
FIG. II-13
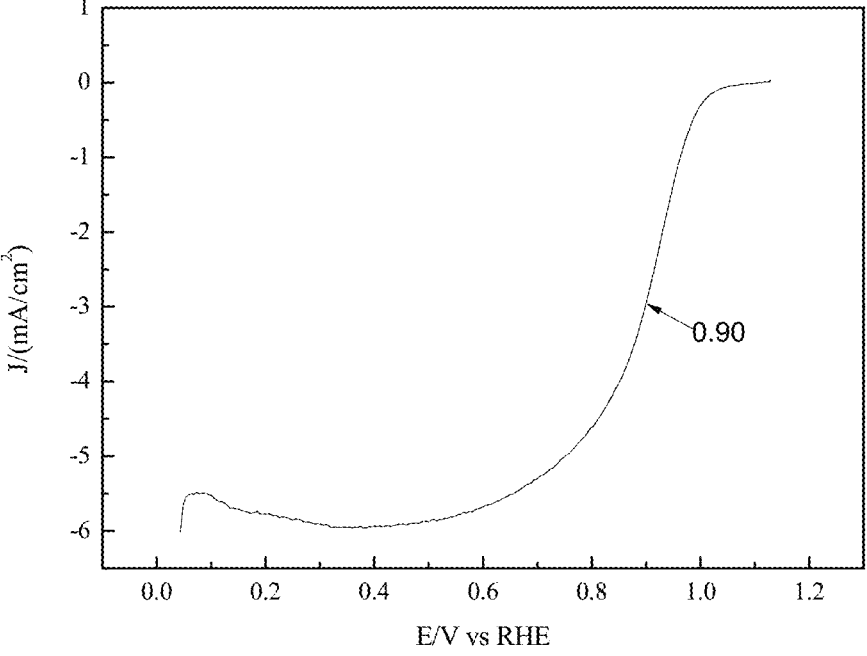
FIG. II-14

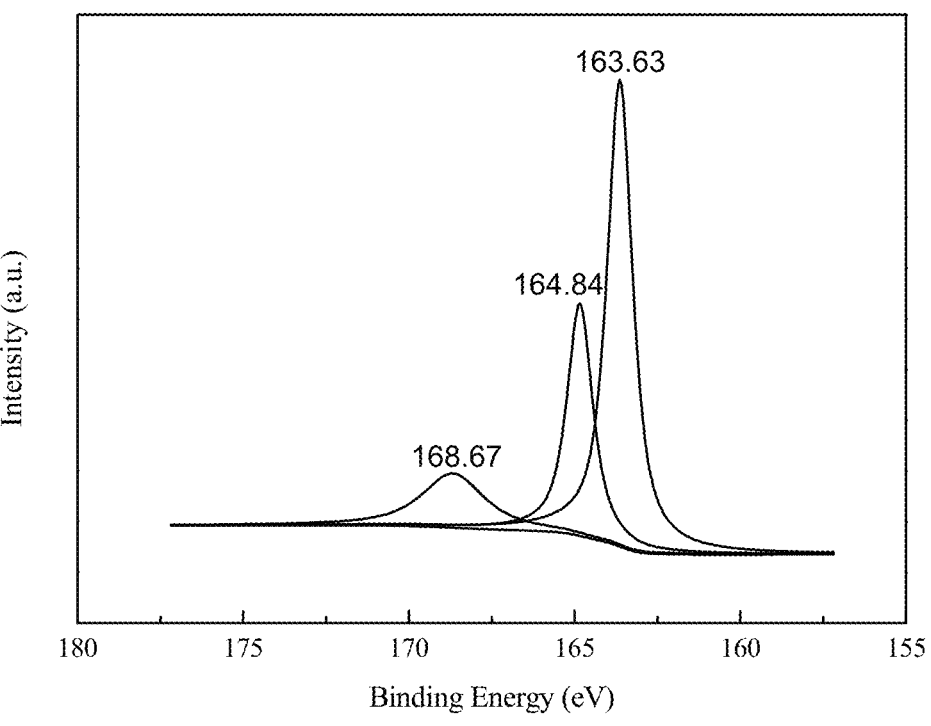
FIG. II-15
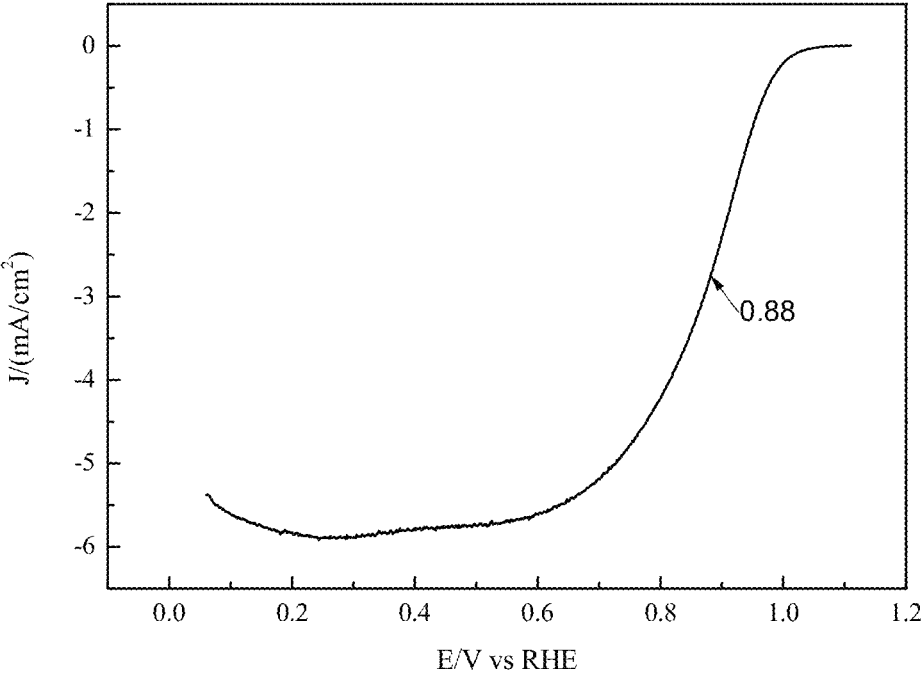
FIG. II-16

CARBON-SUPPORTED PLATINUM GROUP METAL CATALYST, PREPARATION METHOD THEREFOR AND APPLICATION THEREOF

TECHNICAL FIELD

The present invention relates to a carbon-supported platinum group metal catalyst and a process for producing the same and use thereof, in particular to a carbon-supported platinum group metal catalyst for a proton membrane hydrogen fuel cell, and a preparation process and use thereof.

BACKGROUND

The Oxygen Reduction Reaction (ORR) is a key reaction in the field of electrochemistry, for example, in fuel cells and metal air cells, Oxygen Reduction Reaction is a major factor affecting cell performance. The carbon material doped with atoms can be directly used as a catalyst for an oxygen reduction reaction. When used as an oxygen reduction catalyst, it has been reported in literatures that elements such as nitrogen, phosphorus, boron, sulfur, fluorine, chlorine, bromine, iodine, etc. are doped into a carbon material, wherein nitrogen has a radius close to that of carbon atoms and is easily incorporated into the carbon lattice, and thus is the most commonly used doping element. Although there are many reports of the doped carbon material directly used as a fuel cell catalyst, there is a large gap compared with the platinum on carbon catalyst.

To date, the most effective oxygen reduction catalyst is the platinum on carbon catalyst, but it still has disadvantages. On the one hand, platinum resources are scarce and expensive. On the other hand, the currently used commercial platinum on carbon catalyst has unsatisfactory platinum metal dispersion and is easy to agglomerate and deactivate, and the platinum surface area is obviously reduced with time due to platinum dissolution and agglomeration at the hydrogen fuel cell cathode, thereby affecting the service life of the fuel cell. The prior art mainly improves the performance of the platinum on carbon catalyst by controlling the particle size, morphology and structure of platinum and the specific surface area and pore structure of the support, there are also reports in the literature of improving the performance of platinum on carbon catalysts by modifying the carbon support.

The carbon support can improve the specific surface area of the catalyst, reduce the agglomeration of metal particles and improve the metal utilization rate. The increased platinum-supporting amount of the carbon support can result in the membrane electrode having thinner thickness and better performance, but when the platinum-supporting amount is greatly increased, the accumulation of platinum metal particles is easily caused, and the utilization rate of active sites is sharply reduced. In addition, the platinum supporting amount of the platinum on carbon catalyst of the hydrogen fuel cell in practical application is at least 20 wt %, or more, which is much more difficult to be produced compared with the chemical platinum on carbon catalyst (the platinum loading capacity is less than 5 wt %).

The problem of deactivation of platinum on carbon catalysts in proton exchange membrane fuel cells due to carbon corrosion has been highly interested in the art. In addition, platinum accelerates the carbon corrosion rate, and the greater the amount of platinum carried, the faster the carbon corrosion. On the one hand, more carbon support defect sites are beneficial to increasing the platinum supporting amount, but at the same time, carbon corrosion is intensified accordingly. On the other hand, increasing the degree of graphitization alleviates carbon corrosion, but also renders the carbon support surface chemically inert, making it difficult to uniformly disperse platinum on the carbon support.

The information disclosed in the foregoing Background section is only for enhanced understanding to background of the invention, and thus may include information that is not already known to a person of ordinary skill in the art.

SUMMARY OF THE INVENTION

The first purpose of the present invention is to provide a carbon-supported platinum group metal catalyst, which is capable of significantly improving specific activity by weight and electrochemical area; especially in the case of high platinum supporting amount. The second purpose of the present invention is to improve the overall performance of the catalyst, in particular the increased stability of the specific activity by weight and the electrochemical area, on the basis of the aforementioned objects. The third purpose of the invention is to improve the carbon corrosion resistance of the carbon-supported platinum group metal catalyst based on the aforementioned purposes. The fourth purpose of the present invention is to provide a simple process for producing the carbon-supported platinum group metal catalyst in addition to the above purposes. Other purposes of the invention will be apparent from the detailed discussion below and Examples of the invention.

To achieve one or more of the above purposes, the present invention provides technical solutions of the following aspects.

1. A carbon-supported platinum group metal catalyst, characterized in having a characteristic peak between 399 ev and 400.5 ev in $N_{1s}$ spectrum peaks as analyzed by XPS of the carbon-supported platinum group metal catalyst, and is free of or substantially free of other characteristic peak between 395 ev and 405 ev; the support of the carbon-supported platinum group metal catalyst is conductive carbon black doped with nitrogen; the carbon-supported platinum group metal catalyst comprises platinum in a content by weight of 20% to 70%, preferably 40% to 70%, and may be, for example, 45% to 65%.

2. The carbon-supported platinum group metal catalyst according to aspect 1, wherein the support of the carbon-supported platinum group metal catalyst is sulfur-nitrogen doped conductive carbon black.

3. The carbon-supported platinum group metal catalyst according to aspect 1, characterized in that, between 160 ev and 170 ev in the $S_{2P}$ spectrum peaks as analyzed by XPS, the peak area of those between 163 ev and 166 ev accounts for greater than 92%, or greater than 95%, or greater than 98%, or there are only peak(s) between 163 ev and 166 ev present.

4. The carbon-supported platinum group metal catalyst according to aspect 1, characterized in that the conductive carbon black is a common conductive carbon black, a superconducting carbon black or an extra conductive carbon black.

5. The carbon-supported platinum group metal catalyst according to aspect 1, characterized in that the platinum group metal is selected from platinum (Pt), palladium (Pd), rhodium (Rh), iridium (Ir), osmium (Os), and ruthenium (Ru), preferably from platinum, palladium, rhodium, and iridium, further preferably from platinum and palladium, for example, platinum.

6. The carbon-supported platinum group metal catalyst according to aspect 1, characterized in that the carbon-supported platinum group metal catalyst has a resistivity of <10Ω·m, preferably <2Ω·m.

7. A hydrogen fuel cell, characterized in that the carbon-supported platinum group metal catalyst according to any one of aspects 1 to 11 is used in the anode and/or the cathode of the hydrogen fuel cell.

8. A carbon material, characterized in that the carbon material is nitrogen doped conductive carbon black, having a characteristic peak between 399 ev and 400.5 ev in $N_{1s}$ spectrum peaks as analyzed by XPS, and being free of other characteristic peak between 395 ev and 405 ev;

9. A process for producing the carbon-supported platinum group metal catalyst according to any one of aspects 1 to 6, comprising the steps of:

(1) a step of immersion of a nitrogen source: mixing a carbon material with an aqueous solution of a nitrogen source (wherein, optionally, a small amount of ethanol is additionally added as needed, such as dispersing the carbon material in a 20% aqueous ethanol solution), and immersing to obtain a nitrogen source-immersed carbon material;

(2) a step of producing a nitrogen doped carbon material: heating the nitrogen source-immersed carbon material obtained in the step (1) to 1000-1500° C. in an inert gas at a temperature-rising rate of 8-15° C./min, followed by a thermostatic treatment for 0.5-10 h, to obtain a nitrogen doped carbon material; and (3) a step of supporting the platinum group metal: supporting a platinum group metal on the nitrogen doped carbon material obtained in the step (2) as a support;

wherein the carbon material is preferably a conductive carbon black.

10. The process according to aspect 9, characterized in that, in (2), the thermostatic treatment is carried out at a temperature of 1150° C. to 1450° C.

11. The process according to the aspect 9, characterized in that the nitrogen source is aqueous ammonia or urea.

12. The process according to aspect 9, characterized in that the weight ratio of the carbon material to the nitrogen source, calculated as the nitrogen element comprised, is 30:1 to 1:2.

13. The process according to aspect 6, characterized in that the carbon material has an oxygen content by weight of more than 4% in XPS analysis.

14. The process according to aspect 9, characterized in that the step of supporting the platinum group metal comprises:

(a) dispersing the nitrogen doped carbon material obtained in the step (2) and a platinum group metal precursor in an aqueous phase, and adjusting the pH value to 8-12;

(b) adding a reducing agent for reduction; and (c) separating out the solid, and subjecting to post-treatment to obtain the platinum on carbon catalyst.

15. The process according to aspect 14, characterized in that the platinum group metal precursor is chloroplatinic acid, potassium chloroplatinate, or sodium chloroplatinate; and the concentration of the platinum group metal precursor is 0.5 mol/L-5 mol/L.

16. The process according to the aspect 14, characterized in that, in the step (b), the reducing agent is selected from the group consisting of citric acid, ascorbic acid, formaldehyde, formic acid, ethylene glycol, sodium citrate, hydrazine hydrate, sodium borohydride and glycerol; the molar ratio of the reducing agent to the platinum is 2-100; and the reduction is carried out at a temperature of 50-150° C. for 2-15 h.

Without being limited with any known theory, preferably, the characteristic peak between 163 ev and 166 ev is believed to be a characteristic peak of thiophenic sulfur, based on analysis of experimental data of characteristic peaks between 163 ev and 166 ev, e.g. as disclosed and discussed in the Examples of the present invention. In one embodiment, preferably, the characteristic peak of thiophenic sulfur is believed to be bimodal.

The heteroatoms and the carbon material have various binding modes, and various interactions are present between heteroatoms, and the binding modes of the heteroatoms with the carbon material and the interactions between the heteroatoms can be influenced by different preparation processes and raw materials and different operation steps and conditions in the doping process, so that the properties of the heteroatoms and the carbon materials are greatly different, and the functions of the heteroatoms and the carbon material are remarkably changed. In the field, how to control the binding mode of the heteroatom with the carbon material and the interaction between the heteroatoms is a difficulty for doping atoms. The research of the present invention finds that when the conductive carbon black is doped, a carbon material with unique property can be produced by controlling the binding mode of the heteroatom with the conductive carbon black and the interaction between the heteroatoms, thereby obviously improving the specific activity and the electrochemical area, improving the comprehensive performance of the catalyst, improving the stability of the specific activity and the electrochemical area, improving the carbon corrosion resistance of the carbon-supported platinum group metal catalyst, and the like.

Compared with the prior art, the invention can achieve the following beneficial technical effects.

I. The invention produces a type of conductive carbon black with atoms-doped surface with unique properties by a simple process, compared with the existing doped carbon material, the sulfur doped on the surface of the conductive carbon black only exists in the form of thiophenic sulfur, and the nitrogen doped on the surface can only exist in the form of pyrrolic nitrogen, and the characteristics can obviously improve the specific activity by weight and the electrochemical area of the carbon-supported platinum group metal catalyst. Furthermore, the surface of the conductive carbon black can be doped with phosphorus and/or boron, where the phosphorus doped on the surface can only have a characteristic peak between 132.5 ev and 134.5 ev, and the boron doped on the surface can only have a characteristic peak between 189 ev and 191 ev, so that the comprehensive performance of the carbon-supported platinum group metal catalyst can be improved, and particularly the specific activity by weight and the stability of the electrochemical area are improved. Furthermore, the surface of the conductive carbon black can be doped with multiple (for example, three or four) hetero elements, which is beneficial to improving the carbon corrosion resistance of the carbon-supported platinum group metal catalyst.

II. The doped conductive carbon black of the present invention is suitable for producing carbon-supported platinum group metal catalysts with high platinum supporting amount, and has excellent comprehensive catalytic performance and carbon corrosion resistance when the platinum group metal supporting amount reaches 70 wt %.

III. The platinum supporting amount of the carbon-supported platinum group metal catalyst for the hydrogen fuel cell in practical application is generally 20 wt % or more, and producing catalysts with high platinum group metal supporting amount with excellent performance is very difficult. The chemical reduction process has simple process, but the utilization rate of the platinum group metal is low, and the catalytic activity is relatively low. However, the doped conductive carbon black produced by the present invention is used as a support, and a chemical reduction process in an aqueous phase is adopted, so that a catalyst with both high platinum supporting amount having both good specific activity by weight and stability can be easily produced.

The present invention provides, by way of example, the following illustrative embodiments, or combinations thereof:

A first series of exemplary embodiments of the present invention comprise:

1、 A platinum on carbon catalyst, characterized in being free of characteristic peak between 395 ev and 405 eV other than a characteristic peak between 399 ev and 400.5 eV in $N_{1s}$ spectrum peaks as analyzed by XPS.

2、 The platinum on carbon catalyst according to exemplary embodiment 1, characterized in that platinum is comprised in a content by weight of 20% to 70%, preferably 40% to 70%, based on the weight of the catalyst.

3、 The platinum on carbon catalyst according to exemplary embodiment 1, characterized in that the platinum on carbon catalyst has a resistivity of less than 10Ω·m.

4、 The carbon-supported platinum group metal catalyst according to exemplary embodiment 1, characterized in that the support of the carbon-supported platinum group metal catalyst is nitrogen doped conductive carbon black, nitrogen doped graphene, or nitrogen doped carbon nanotube.

5、 The platinum on carbon catalyst according to exemplary embodiment 4, characterized in that the conductive carbon black is EC-300J, EC-600JD, ECP600JD, VXC72, Black pears 2000, PRINTEX XE2-B, PRINTEX L6, or HIBLAXK 40B2.

6、 A process for producing a platinum on carbon catalyst, comprising:
   (1) a step of immersion of a nitrogen source: mixing a carbon material and a nitrogen source aqueous solution, and immersing, to obtain a nitrogen source-immersed carbon material;
   (2) a step of producing a nitrogen doped carbon material: heating the nitrogen source-immersed carbon material obtained in the step (1) to 1000-1500° C. in an inert gas at a temperature-rising rate of 8-15° C./min, followed by a thermostatic treatment for 0.5-10 h, to obtain a nitrogen doped carbon material; and
   (3) a step of supporting platinum: supporting a platinum group metal on the nitrogen doped carbon material obtained in the step (2) as a support.

7、 The process according to exemplary embodiment 6, characterized in that, in (2), the thermostatic treatment is carried out at a temperature of 1150° C. to 1450° C.

8、 The process according to the exemplary embodiment 6, characterized in that the nitrogen source is aqueous ammonia or urea.

9、 The process according to exemplary embodiment 6, characterized in that the weight ratio of the carbon material to the nitrogen source, calculated as the nitrogen element comprised, is 30:1 to 1:2.

10、 The process according to exemplary embodiment 6, characterized in that the carbon material is conductive carbon black, graphene, or carbon nanotubes.

11、 The process according to exemplary embodiment 10, characterized in that the conductive carbon black is EC-300J, EC-600JD, ECP-600JD, VXC72, Black pearls 2000, PRINTEX XE2-B, PRINTEX L6 or HIBLAXAXK 40B2.

12、 The process according to exemplary embodiment 6, characterized in that the carbon material has an oxygen content by weight of more than 4% in XPS analysis.

13、 The process according to exemplary embodiment 6, characterized in that the carbon material has a resistivity of less than 10Ω·m.

14、 The process according to exemplary embodiment 6, characterized in that the carbon material has a specific surface area of 10 $m^2$/g to 2000 $m^2$/g.

15、 The process according to exemplary embodiment 6, characterized in that the step of supporting platinum includes: (a) dispersing the nitrogen doped carbon material obtained in the step (2) and a platinum precursor in an aqueous phase, and adjusting the pH value to 8-12; (b) adding a reducing agent for reduction; and (c) separating out solid, and subjecting to post-treatment to obtain the platinum on carbon catalyst.

16、 The process according to exemplary embodiment 15, characterized in that the platinum group metal precursor is chloroplatinic acid, potassium chloroplatinate, or sodium chloroplatinate; and the concentration of the platinum group metal precursor is 0.5 mol/L-5 mol/L.

17、 The process according to exemplary embodiment 15, characterized in that, in the step (b), the reducing agent is selected from the group consisting of citric acid, ascorbic acid, formaldehyde, formic acid, ethylene glycol, sodium citrate, hydrazine hydrate, sodium borohydride and glycerol; the molar ratio of the reducing agent to the platinum is 2-100; and the reduction is carried out at a temperature of 50-150° C. for 2-15 h.

18、 A platinum on carbon catalyst, characterized in that the catalyst is produced by the process according to any one of exemplary embodiments 6 to 17.

19、 A hydrogen fuel cell, characterized in that the platinum on carbon catalyst according to any one of exemplary embodiments 1 to 5 and 18 is used in the anode and/or the cathode of the hydrogen fuel cell.

A second series of exemplary embodiments of the present invention comprise:

1、 A platinum on carbon catalyst, characterized in comprising a carbon support and a platinum metal supported on the carbon support, wherein the carbon support is a sulfur-nitrogen doped carbon material; and between 160 ev and 170 ev in the $S_{2P}$ spectrum analyzed by XPS, there are only characteristic peaks between 163 ev and 166 ev present.

2、 The platinum on carbon catalyst according to exemplary embodiment 1, characterized in being free of characteristic peak between 390 ev and 410 ev other than a characteristic peak between 399 ev and 400.5 eV in $N_{1s}$ spectrum peaks as analyzed by XPS.

3. The platinum on carbon catalyst according to exemplary embodiment 1, characterized in that platinum is comprised in a content by weight of 20% to 70%, preferably 40% to 70%, based on the weight of the catalyst.

4. The platinum on carbon catalyst according to exemplary embodiment 1, characterized in the characteristic peaks between 163 ev and 166 ev are positioned at 163.4±0.5 ev and 164.7±0.5 ev.

5. The platinum on carbon catalyst according to exemplary embodiment 1, characterized in that the sulfur-nitrogen doped carbon material is sulfur-nitrogen doped conductive carbon black, sulfur-nitrogen doped graphene, or sulfur-nitrogen doped carbon nanotube.

6. A process for producing a platinum on carbon catalyst, comprising:

(1) a step of producing a sulfur-nitrogen doped carbon material;

(2) a step of supporting platinum using the sulfur-nitrogen doped carbon material obtained in the step (1) as a support.

wherein the step (1) comprises an operation of doping sulfur and an operation of doping nitrogen;

the operation of doping sulfur comprises: placing the carbon material in an inert gas containing thiophene, and treating at 1000-1500° C. for 0.5-10 h;

the operation of doping nitrogen is performed before, after or simultaneously with the operation of doping sulfur.

7. The process according to exemplary embodiment 6, characterized in that the weight ratio of the carbon material to thiophene, calculated as the sulfur element comprised in thiophene, is 20:1 to 2:1.

8. The process according to exemplary embodiment 6, characterized in that, the operation of doping sulfur is carried out at a temperature of 1150° C. to 1450° C.

9. The process according to exemplary embodiment 6, characterized in that the weight ratio of the carbon material to the nitrogen source, calculated as the nitrogen element comprised in the nitrogen source, is 30:1 to 1:2.

10. The process according to exemplary embodiment 6, characterized in that the carbon material is conductive carbon black, graphene, or carbon nanotubes.

11. The process according to exemplary embodiment 6, characterized in that the carbon material has a resistivity of less than 10Ω·m, and a specific surface area of 10 m²/g to 2000 m²/g.

12. The process according to exemplary embodiment 6, characterized in that the step of supporting platinum comprises:

(a) dispersing the nitrogen doped carbon material obtained in the (1) and a platinum group metal precursor in an aqueous phase, and adjusting the pH value to 8-12;

(b) adding a reducing agent for reduction; and (c) separating out the solid, and subjecting to post-treatment to obtain the platinum on carbon catalyst.

13. The process according to exemplary embodiment 12, characterized in that, in (a), the platinum precursor is chloroplatinic acid, potassium chloroplatinate, or sodium chloroplatinate; and the concentration of the platinum precursor is 0.5 mol/L-5 mol/L 14. The process according to the exemplary embodiment 12, characterized in that, in (b), the reducing agent is selected from the group consisting of citric acid, ascorbic acid, formaldehyde, formic acid, ethylene glycol, sodium citrate, hydrazine hydrate, sodium borohydride or glycerol; the molar ratio of the reducing agent to the platinum is 2-100; and the reduction is carried out at a temperature of 60° C.-90° C. for 4h-15 h.

15. A process for producing a platinum on carbon catalyst, comprising:

(1) a step of immersion of a nitrogen source: mixing a carbon material and a nitrogen source aqueous solution, and immersing, to obtain a nitrogen source-immersed carbon material;

(2) a step of producing a sulfur-nitrogen doped carbon material: treating the nitrogen source-immersed carbon material obtained in (1) at 1000° C.-1500° C. in a thiophene containing inert gas for 0.5-10 h, to provide the nitrogen doped carbon material; and (3) a step of supporting platinum using the sulfur-nitrogen doped carbon material obtained in (2) as a support.

16. A platinum on carbon catalyst, characterized in that the catalyst is produced by the process according to any one of exemplary embodiments 6 to 15.

17. A hydrogen fuel cell, characterized in that the platinum on carbon catalyst according to any one of exemplary embodiments 1 to 5 and 16 is used in the anode and/or the cathode of the hydrogen fuel cell.

A third series of exemplary embodiments of the present invention comprise:

1. A nitrogen doped carbon material, characterized in being free of characteristic peak between 395 ev and 405 ev other than a characteristic peak between 399 ev and 400.5 ev in $N_{1s}$ spectrum peaks as analyzed by XPS.

2. The nitrogen doped carbon material according to exemplary embodiment 1, characterized in that the nitrogen doped carbon material has a nitrogen content by weight of 0.1% to 10% in XPS analysis.

3. The nitrogen doped carbon material according to exemplary embodiment 1, characterized in that the nitrogen doped carbon material has an oxygen content by weight of >4% in XPS analysis.

4. The nitrogen doped carbon material according to exemplary embodiment 1, characterized in that the carbon material has a resistivity of less than 10Ω·m.

5. The nitrogen doped carbon material according to exemplary embodiment 1, characterized in that the nitrogen doped carbon material has a specific surface area of 10 m²/g to 2000 m²/g.

6. The nitrogen doped carbon material according to exemplary embodiment 1, characterized in that the nitrogen doped carbon material is nitrogen doped conductive carbon black, nitrogen doped graphene, or nitrogen doped carbon nanotubes 7. The nitrogen doped carbon material according to exemplary embodiment 6, characterized in that the conductive carbon black is EC-300J, EC-600JD, ECP600JD, VXC72, Black pears 2000, PRINTEX XE2-B, PRINTEX L6, or HIBLAXK 40B2.

8. A carbon support for a platinum on carbon catalyst, characterized in that the carbon support is a nitrogen doped conductive carbon black, being free of characteristic peak between 395 ev and 405 eV other than a characteristic peak between 399 ev and 400.5 eV in $N_{1s}$ spectrum peaks as analyzed by XPS; having an oxygen content by weight of 4%-15% and a nitrogen content by weight of 0.2%-5%, by XPS analysis; and having a specific surface area of 200 m²/g-2000 m²/g.

9. The carbon support according to exemplary embodiment 8, characterized in that the conductive carbon black is EC-300J, EC-600JD, ECP-600JD, VXC72, Black pears 2000, PRINTEX XE2-B, PRINTEX L6, or HIBLAXK 40B2.

10. A process for producing a nitrogen doped carbon material, comprising:

(1) a step of immersion of a nitrogen source: mixing a carbon material and a nitrogen source aqueous solution, and immersing, to obtain a nitrogen source-immersed carbon material;

(2) a step of producing a nitrogen doped carbon material: heating the nitrogen source-immersed carbon material obtained in (1) to 1000-1500° C. in an inert gas at a temperature-rising rate of 8° C./min-15° C./min, followed by a thermostatic treatment for 0.5-10 h.

11. The process according to exemplary embodiment 10, characterized in that, in (2), the thermostatic treatment is carried out at a temperature of 1150° C. to 1450° C.

12. The process according to the exemplary embodiment 10, characterized in that the nitrogen source is aqueous ammonia or urea.

13. The process according to exemplary embodiment 10, characterized in that the weight ratio of the carbon material to the nitrogen source, calculated as the nitrogen element comprised in the nitrogen source, is 30:1 to 1:2; preferably 25:1 to 1:1.5.

14. Use of the nitrogen doped carbon material or the carbon support described in any one of embodiments 1 to 9 as an electrode material in electrochemistry.

15. A fuel cell, characterized in using the nitrogen doped carbon material or the carbon support according to any one of exemplary embodiments 1 to 9.

16. The fuel cell according to exemplary embodiment 15, characterized in that the fuel cell is a hydrogen fuel cell.

17. A metal-air cell, characterized in using the nitrogen doped carbon material or the carbon support according to any one of exemplary embodiments 1 to 9.

18. The metal-air cell according to exemplary embodiment 17, characterized in that the metal-air cell is a lithium-air cell.

Additional features and advantages of the invention will be illustrated in the embodiments which follows.

DESCRIPTION OF DRAWINGS

Implementing Solution I

FIG. I-1 shows an XPS spectrum of the nitrogen doped carbon support of Example 1.

FIG. I-2 shows an XPS spectrum of the nitrogen doped carbon support of Example 3.

FIG. I-3 shows an XPS spectrum of the platinum on carbon catalyst of Example 5.

FIG. I-4 shows polarization curves before and after 5000 cycles of the platinum on carbon catalyst of Example 5.

FIG. I-5 shows an XPS spectrum of the platinum on carbon catalyst of Example 6.

FIG. I-6 shows an XPS spectrum of the platinum on carbon catalyst of Example 7.

FIG. I-7 shows an XPS spectrum of the platinum on carbon catalyst of Example 8.

FIG. I-8 shows polarization curves before and after 5000 cycles of the platinum on carbon catalyst of comparative example 3.

Implementing Solution II

FIG. II-1 shows an XPS spectrum of sulfur in the sulfur-nitrogen doped carbon material of Example II-1.

FIG. II-2 shows an XPS spectrum of nitrogen in the sulfur-nitrogen doped carbon material of Example II-1.

FIG. II-3 shows an XPS spectrum of sulfur in the sulfur-nitrogen doped carbon material of Example II-2.

FIG. II-4 shows an XPS spectrum of sulfur in the sulfur-nitrogen doped carbon material of Example II-3.

FIG. II-5 shows an XPS spectrum of sulfur in the sulfur-nitrogen doped carbon material of Example II-4.

FIG. II-6 shows a TEM pattern of the platinum on carbon catalyst of Example II-5.

FIG. II-7 shows a polarization curve of the platinum on carbon catalyst of Example II-5.

FIG. II-8 shows an XPS spectrum of sulfur in the platinum on carbon catalyst of Example II-5.

FIG. II-9 shows an XPS spectrum of nitrogen in the platinum on carbon catalyst of Example II-5.

FIG. II-10 shows an XPS spectrum of sulfur in the platinum on carbon catalyst of Example II-7.

FIG. II-11 shows an XPS spectrum of nitrogen in the platinum on carbon catalyst of Example II-7.

FIG. II-12 shows an XPS spectrum of sulfur in the sulfur-nitrogen doped carbon material of comparative example II-1.

FIG. II-13 shows a TEM pattern of the platinum on carbon catalyst of comparative example II-1.

FIG. II-14 shows a polarization curve of the platinum on carbon catalyst of comparative example II-1.

FIG. II-15 shows an XPS spectrum of sulfur in the sulfur-nitrogen doped carbon material of comparative example II-2.

FIG. II-16 shows a polarization curve of the platinum on carbon catalyst of comparative example II-3.

EMBODIMENTS

The embodiments of the present invention are illustrated below, whilst it should be understood that the protection scopes of the present invention are not restricted to the embodiments or to the principle explanation thereof; instead, the protection scopes are defined by the claims.

In the context of the specification, any features or technical means not discussed specifically will be understood with the meanings known in the art without any substantive modification, unless otherwise designated. Moreover, any embodiment described in the specification can be combined freely with one or more other embodiments described in the specification, and the technical solution or idea formed therefrom is deemed as a part of the original disclosure or original record, but cannot be considered as a new content not disclosed or expected by the specification, unless those skilled in the art believe that the combination is obviously unreasonable.

All features disclosed by the specification can be combined arbitrarily, and the combination should be understood as the disclosure of the present invention, unless those skilled in the art believe that the combination is obviously unreasonable. The numerical points disclosed by the specification comprise not only the specifically mentioned individual numbers in the Examples, but also the terminals of each numerical ranges, while any of the ranges formed by the combination of the numerical points should be deemed as being disclosed or recorded by the specification.

Technical and scientific terms used herein are defined by the definitions given specifically here, while the others without given definitions are understood according to their ordinary meanings in the art.

The "doping element" in the present invention includes nitrogen, phosphorus, boron, sulfur, fluorine, chlorine, bromine, and iodine, or is selected from these elements.

In the present invention, a material "doped with" an element means that the element or elements specifically mentioned are doped into the material, but the material may also be doped with other elements than the element or elements specifically mentioned, especially those commonly used in the art.

In the present invention, an element "doped" material means that the element or elements specifically mentioned are doped into the material; wherein in one embodiment the material may also be doped with other elements than the one or more elements specifically mentioned; and preferably, the material is free of other doping elements than the element or elements specifically mentioned.

In the present invention, unless capable of being uniquely identified as "carbon material containing a doping element" according to the context or self-limitation, the other references to "carbon material" refer to carbon material containing no doping element. The same applies to the specific conceptions of carbon materials.

In the present invention, "carbon black" and "carbonblack" are exchangeable terms to substitute the other. In the present invention, graphene, carbon nanotubes and conductive carbon black, which may be used in the carbon material of the present invention, have concepts well known in the art, respectively, and belong to different concepts from each other. However, according to the present invention, one carbon material may comprise a lower content of one or more other carbon materials, as long as it remains within the scope of the carbon materials well recognized by one skilled in the art. For example, "graphene" may contain trace amount (e.g., less than 1%, or less than 0.1% by weight) of conductive carbon black and/or carbon nanotubes due to various reasons. Preferably, for example, for the purposes of the present invention, the conductive carbon black comprises less than 5% by weight, preferably less than 2% by weight, of graphene and/or carbon nanotubes.

By "inert gas "in the present invention is meant a gas that does not have any appreciable effect on the properties of the doped carbon material during the preparation process of the present invention. The same applies to the specific conceptions of carbon materials.

The numerical ranges defined in the present invention include the endpoints of the numerical ranges. "ranges" as disclosed herein are given as lower and upper limits, e.g., one or more lower limits with one or more upper limits. A given range may be defined by selecting a lower limit and an upper limit that define the boundaries of the given range. All ranges defined in this manner are inclusive and combinable, i.e., any lower limit may be combined with any upper limit to form a range. For example, when ranges of 60-110 and 80-120 are listed for particular parameters, it is understood that ranges of 60-120 and 80-110 are also contemplated. Furthermore, if the lower limits listed are 1 and 2 and the upper limits listed are 3, 4 and 5, then the following ranges are all contemplated: 1-3, 1-4, 1-5, 2-3, 2-4, and 2-5.

In the present invention, unless otherwise indicated, the terms "comprising," "including," "containing," "having," and similar words are to be construed as open definition mode, but should also be interpreted to cover the closed definition mode. For example, "comprising" means a case that other elements not listed may also be included, but also means the disclosure of the case comprising only the elements listed. Furthermore, as used herein, "comprising/including" is interpreted as specifying the presence of the stated features, integers, steps or components as referred to, but does not exclude the presence or addition of one or more other features, integers, steps, components or groups thereof. Additionally, the term "comprising" is intended to include embodiments encompassed by the terms "consisting essentially of . . . " and "consisting of . . . ". Similarly, the term "consisting essentially of . . . " is intended to include embodiments encompassed by the term "consisting of . . . ".

In the present invention, all embodiments and preferred embodiments mentioned herein can be combined with each other to form new technical solutions, unless otherwise indicated. In particular, for example, for embodiments I and II encompassed by the invention, the technical features and solutions mentioned therein can be combined internally and with one another, unless such a combination is contrary to the purposes of the invention.

In the present invention, all technical features and preferred technical features mentioned herein can be combined with each other to form new technical solutions, unless otherwise indicated.

In the present invention, unless otherwise clear from the context or self-definition, all references to "pore volume" refer to the total pore volume of single-site adsorption at the maximum of $P/P_0$.

In the present invention, "substantially free of other characteristic peak between 395 ev and 405 ev" means that the peak area of any other characteristic peak accounts for less than 10%, preferably less than 5%, except for the characteristic peak between 399 ev and 400.5 ev (for example, preferably the characteristic peak of pyrrolic nitrogen).

Implementing Solution I

The implementing solution I of the present invention provides a platinum on carbon catalyst, which is free of characteristic peak between 395 ev and 405 ev other than a characteristic peak between 399 ev and 400.5 ev in $N_{1s}$ spectrum peaks as analyzed by XPS.

In one embodiment of implementing solution I, the carbon-supported platinum group metal catalyst according to the present invention does not contain other doping elements than nitrogen.

In one embodiment of implementing solution I, the platinum group metal is platinum.

In one embodiment of implementing solution I, the carbon-supported platinum group metal catalyst according to the present invention does not contain other metallic elements than platinum.

In one embodiment of implementing solution I, the carbon-supported platinum group metal catalyst according to the present invention comprises platinum in a content by weight of 0.1%-80%, preferably 20% to 70%, more preferably 40% to 70%, based on the weight of the catalyst.

In one embodiment of implementing solution I, the carbon-supported platinum group metal catalyst according to the present invention has a resistivity of <10.0Ω·m, preferably <2Ω·m.

In one embodiment of implementing solution I, the carbon-supported platinum group metal catalyst according to the present invention has a specific surface of 80 $m^2/g$-1500 $m^2/g$, preferably 100 $m^2/g$-200 $m^2/g$.

In one embodiment of implementing solution I, the support of the carbon-supported platinum group metal catalyst according to the present invention is nitrogen doped conductive carbon black, nitrogen doped graphene or nitrogen doped carbon nanotubes.

In one embodiment of implementing solution I, for the carbon-supported platinum group metal catalyst according to the present invention, the conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

Implementing solution I of the present invention also provides a process for producing a carbon-supported platinum group metal catalyst, comprising:

(1) a step of immersion of a nitrogen source: mixing a carbon material and a nitrogen source aqueous solution, and immersing, to obtain a nitrogen source-immersed carbon material;

(2) a step doped producing the nitrogen doped carbon material: heating the nitrogen source-immersed carbon material general obtained in the step (1) to 1000-1500° C. in an inert gas at a temperature-rising rate of 8-15° C./min, followed by a thermostatic treatment for 0.5-10 h, to obtain the nitrogen doped carbon material; and (3) a step of supporting a platinum group metal (e.g. platinum): supporting a platinum group metal (e.g. platinum) on the nitrogen doped carbon material obtained in the step (2) as a support.

According to the process for producing the carbon-supported platinum group metal catalyst of implementing solution I of the present invention, the thermostatic treatment may be carried out at a temperature of 1000° C. to 1500° C., preferably 1150° C. to 1450° C.; for 0.5 to 10 hours, preferably 1 to 5 hours, more preferably 2 to 4 hours.

According to the process for producing a carbon-supported platinum group metal catalyst of implementing solution I of the present invention, the nitrogen source may be aqueous ammonia and/or urea.

According to the process for producing a carbon-supported platinum group metal catalyst of implementing solution I of the present invention, the weight ratio of the carbon material to the nitrogen source, calculated as the nitrogen element comprised in the nitrogen source, is 30:1 to 1:2; preferably 25:1 to 1:1.5.

According to the process for producing a carbon-supported platinum group metal catalyst of implementing solution I of the present invention, the carbon material may be conductive carbon black, graphene, or carbon nanotubes.

According to the process for producing a carbon-supported platinum group metal catalyst of implementing solution I of the present invention, the conductive carbon black may be common conductive carbon black, super conductive carbon black or extra conductive carbon black, for example, the conductive carbon black may be one or more of Ketjen black series superconducting carbon black, Cabot series Conductive carbon black and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2.

According to the process for producing the carbon-supported platinum group metal catalyst of implementing solution I of the present invention, the preparation method and the source of the conductive carbon black are not limited. The conductive carbon black can be acetylene black, furnace carbon black or the like.

According to the process for producing a carbon-supported platinum group metal catalyst of the implementing solution I, the conductive carbon black generally has a ID/IG value of 0.8 to 5, preferably 1 to 4. In the Raman spectrum, a peak at around 1320 cm$^{-1}$ is a D peak, and a peak at around 1580 cm$^{-1}$ is a G peak, $I_D$ representing the intensity of the D peak, and $I_G$ representing the intensity of the G peak.

According to the process for producing a carbon-supported platinum group metal catalyst of implementing solution I of the present invention, the graphene or the carbon nanotube may be graphene or a carbon nanotube that is not subjected to oxidation treatment, or may be graphene or a carbon nanotube that has been subjected to oxidation treatment.

According to the process for producing a carbon-supported platinum group metal catalyst according to implementing solution I of the present invention, the carbon material has an oxygen content by weight of more than 4%, preferably 4% to 15%, in XPS analysis.

According to the process for producing a carbon-supported platinum group metal catalyst of implementing solution I of the present invention, the carbon material has a resistivity of <10Ω·m, preferably <5Ω·m, and more preferably <2Ω·m.

According to the process for producing a carbon-supported platinum group metal catalyst of implementing solution I of the present invention, the carbon material in the step (1) has a specific surface area of 10 m$^2$/g to 2000 m$^2$/g; and a pore volume of 0.2 mL/g-6.0 mL/g.

According to the process for producing a carbon-supported platinum group metal catalyst of the implementing solution I of the present invention, in an embodiment of producing the nitrogen doped carbon material, a carbon material is mixed with a nitrogen source aqueous solution, immersed (generally for 12 to 72 hours), dried (generally at 70° C. to 120° C.), then placed in a tube furnace, heated (at a heating rate of optionally 8° C./min to 15° C./min), and then treated at a high temperature (at 1000° C. to 1500° C., preferably at 1150° C. to 1450° C.) for a period of time (which may be 0.5 to 10 hours, generally 1 to 5 hours), thereby obtaining the nitrogen doped carbon material.

According to the process for producing a carbon-supported platinum group metal catalyst according to implementing solution I of the present invention, the nitrogen doped carbon material produced in step (2) can be easily dispersed in an aqueous phase. However, it is difficult to disperse some carbon materials, such as Ketjen black, directly in the aqueous phase.

According to the process for producing a carbon-supported platinum group metal catalyst of implementing solution I of the present invention, the step of supporting the platinum group metal (e.g., platinum) comprises:

(a) dispersing the nitrogen doped carbon material obtained in the step (2) and a platinum group metal precursor (such as a platinum precursor) in an aqueous phase, and adjusting the pH value to 8-12 (preferably, adjusting the pH value to 10±0.5);

(b) adding a reducing agent for reduction; and (c) separating out the solid, and subjecting to post-treatment to obtain the carbon-supported platinum group metal (e.g., carbon-supported platinum) catalyst.

According to the process for producing a carbon-supported platinum group metal catalyst of implementing solution I of the present invention, the platinum group metal precursor (e.g., platinum precursor) is chloroplatinic acid, potassium chloroplatinate, or sodium chloroplatinate; and the concentration of the platinum group metal precursor (e.g., platinum precursor) is 0.5 mol/L to 5 mol/L.

According to the process for producing a carbon-supported platinum group metal catalyst of implementing solution I of the present invention, in the step (a), the pH of the aqueous phase is adjusted with an aqueous solution of sodium carbonate, an aqueous solution of potassium hydroxide, an aqueous solution of sodium hydroxide, or aqueous ammonia.

According to the process for producing a carbon-supported platinum group metal catalyst of implementing solution I of the present invention, in the step (b), the reducing agent is one or more selected from citric acid, ascorbic acid, formaldehyde, formic acid, ethylene glycol, sodium citrate, hydrazine hydrate, sodium borohydride, and glycerol.

According to the process for producing a carbon-supported platinum group metal catalyst of implementing solution I of the present invention, in the step (b), the molar ratio of the reducing agent to platinum is 2 to 100.

According to the process for producing a carbon-supported platinum group metal catalyst of implementing solution I of the present invention, in the step (b), the reduction is carried out at a temperature of 50° C. to 150° C., preferably 60° C. to 90° C.; for 4 to 15 hours, preferably 8 to 12 hours.

According to the process for producing a carbon-supported platinum group metal catalyst of implementing solution I of the present invention, the post-treatment includes: washing, filtering and drying.

Implementing solution I of the present invention also provides a carbon-supported platinum group metal catalyst produced by the process of any embodiment of implementing solution I of the present invention described above.

Implementing solution I of the present invention also provides a hydrogen fuel cell using the carbon-supported platinum group metal catalyst according to any embodiment of implementing solution I of the present invention described above in an anode and/or a cathode of the hydrogen fuel cell.

The invention adopts a simple process to dope nitrogen on the surface of the carbon material in the form of pyrrolic nitrogen, thereby producing the platinum on carbon electrode catalyst for hydrogen fuel cell anode hydrogen oxidation reaction or cathode oxygen reduction reaction, which, compared with the conventional catalyst having same carbon material and platinum supporting amount, has higher half-wave potential, and in particular, improves significantly the ECSA and specific activity by weight and stability of the catalyst.

In one embodiment of implementing solution I, the carbon-supported platinum group metal catalyst (e.g., a platinum on carbon catalyst) according to the present invention, when used in an oxygen reduction reaction, in some Examples, has an ECSA>55 m² g⁻¹-Pt, such as in the range of from 55 m² g⁻¹-Pt to 140 m² g⁻¹-Pt In one embodiment of implementing solution I, the carbon-supported platinum group metal catalyst (e.g., a platinum on carbon catalyst) according to the present invention, when used in an oxygen reduction reaction, has a specific activity reduction by weight of <10% after 5000 cycles in some Examples.

In one embodiment of implementing solution I, the carbon-supported platinum group metal catalyst (e.g., a platinum on carbon catalyst) according to the present invention, when used in an oxygen reduction reaction, has a half-wave potential>0.88V, such as 0.88V to 0.92V in some Examples.

In one embodiment of implementing solution I, the carbon-supported platinum group metal catalyst (e.g., a platinum on carbon catalyst) according to the present invention, when used in an oxygen reduction reaction, in some embodiments, has a specific activity by weight of >0.11 A mg⁻¹-Pt, such as 0.11 A mg⁻¹-Pt to 0.44 A mg⁻¹-Pt.

In one embodiment of implementing solution I, the carbon-supported platinum group metal catalyst according to the present invention is a platinum on carbon catalyst.

Implementing Solution II

Implementing solution II of the present invention provides a carbon-supported platinum group metal catalyst, comprising a carbon support and a platinum metal supported on the carbon support, wherein the carbon support is a sulfur-nitrogen doped carbon material; and between 160 ev and 170 ev in the $S_{2P}$ spectrum peaks as analyzed by XPS, there are only characteristic peaks between 163 ev and 166 ev present.

In one embodiment of implementing solution II, the carbon-supported platinum group metal catalyst (e.g., platinum on carbon catalyst) according to the present invention is free of doping elements other than sulfur and nitrogen.

In one embodiment of implementing solution II, the platinum group metal is platinum.

In one embodiment of implementing solution II, the carbon-supported platinum group metal catalyst (e.g., platinum on carbon catalyst) according to the present invention is free of metallic elements other than platinum.

In one embodiment of implementing solution II, the XPS analysis of the carbon-supported platinum group metal catalyst according to the present invention (e.g., platinum on carbon catalyst) shows $S_{2P}$ spectrum peaks with only characteristic peaks between 163 ev and 166 ev present.

In one embodiment of implementing solution II, the XPS analysis of the carbon-supported platinum group metal catalyst according to the present invention (e.g., platinum on carbon catalyst) is free of characteristic peak between 166 ev and 170 ev.

In one embodiment of implementing solution II, the XPS analysis of the carbon-supported platinum group metal catalyst according to the present invention (e.g., a platinum on carbon catalyst) shows $N_{1s}$ spectrum peaks free of characteristic peak between 390 ev and 410 ev other than a characteristic peak between 399 ev and 400.5 ev.

In one embodiment of implementing solution II, the XPS analysis of the carbon-supported platinum group metal catalyst according to the present invention (e.g., platinum on carbon catalyst) shows $N_{1s}$ spectrum peaks with one or two characteristic peaks between 399 ev and 400.5 ev.

In one embodiment of implementing solution II, the carbon-supported platinum group metal catalyst according to the present invention (e.g. platinum on carbon catalyst) comprises platinum in a content by weight of 0.1% to 80%, preferably from 20% to 70%, more preferably from 40% to 70%, based on the weight of the catalyst.

In one embodiment of implementing solution II, the carbon-supported platinum group metal catalyst according to the present invention (e.g., a platinum on carbon catalyst) has a resistivity<10.0Ω·m, preferably <2.0Ω·m.

In one embodiment of implementing solution II, the carbon-supported platinum group metal catalyst according to the present invention (e.g. platinum on carbon catalyst) has a specific surface of 80 m²/g-1500 m²/g, preferably 100 m²/g-200 m²/g.

In one embodiment of implementing solution II, for the carbon-supported platinum group metal catalyst (e.g., a platinum on carbon catalyst) according to the present invention, the sulfur-nitrogen doped carbon material is sulfur-nitrogen doped conductive carbon black, sulfur-nitrogen doped graphene, or sulfur-nitrogen doped carbon nanotubes. The conductive carbon black may be one or more of Ketjen black series superconducting carbon black, Cabot series conductive carbon black, and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2. The graphene or the carbon nanotube can be graphene or carbon nanotube which has been subjected to oxidation treatment or not.

In one embodiment of implementing solution II, the characteristic peak between 163 eV and 166 eV for the carbon-supported platinum group metal catalyst according to the present invention (e.g., a platinum on carbon catalyst) is bimodal, and in some examples, the bimodal peaks are positioned at $163.4\pm0.5$ ev and $164.7\pm0.5$ ev, respectively.

In one embodiment of implementing solution II, the carbon-supported platinum group metal catalyst according to the present invention (e.g., a platinum on carbon catalyst) comprises sulfur in a content by weight of 0.2% to 3% and nitrogen in a content by weight of 0.1% to 5%, based on the weight of the support of the carbon-supported platinum group metal catalyst as measured by XPS test.

Implementing solution II of the present invention also provides a process for producing a carbon-supported platinum group metal catalyst (e.g. platinum on carbon catalyst), comprising:

(1) a step of producing a sulfur-nitrogen doped carbon material;

(2) a step of supporting platinum group metal (e.g. platinum) using the sulfur-nitrogen doped carbon material obtained in the step (1) as a support.

wherein the step (1) comprises an operation of doping sulfur and an operation of doping nitrogen;

the operation of doping sulfur comprises: placing the carbon material in an inert gas containing thiophene, and treating at 1000-1500° C. (preferably thermostatic treatment) for 0.5-10 h;

the operation of doping nitrogen is performed before, after or simultaneously with the operation of doping sulfur.

According to the process for producing a carbon-supported platinum group metal catalyst according to implementing solution II of the present invention, in the operation of doping sulfur, the temperature is raised, if needed, at a rate of not less than 8° C./min, and may be 8° C./min to 15° C./min.

According to the process for producing a carbon-supported platinum group metal catalyst according to implementing solution II of the present invention, the operation of doping nitrogen is performed before, after or simultaneously with the operation of doping sulfur, which may use any conventionally known process for doping nitrogen. In one embodiment, the operation of doping nitrogen is performed before the operation of doping sulfur, where the carbon material and the nitrogen source are mixed and treated at 300° C. to 1500° C. (preferably, treated at a constant temperature) for 0.5 to 10 hours in an inert gas. In another embodiment, the operation of doping nitrogen is performed after the operation of doping sulfur, where the sulfur doped carbon material and the nitrogen source are mixed and treated at 300° C. to 1500° C. (preferably, treated at a constant temperature) for 0.5 to 10 hours in an inert gas.

According to the process for producing a carbon-supported platinum group metal catalyst according to implementing solution II of the present invention, the operation of doping nitrogen is performed simultaneously with the operation of doping sulfur, which may use operation conditions same as those for doping sulfur. In one embodiment, the carbon material is mixed with the nitrogen source and then subjected to the operations of doping nitrogen and doping sulfur simultaneously under conditions same as those for doping sulfur.

According to the process for producing a carbon-supported platinum group metal catalyst of implementing solution II of the present invention, the weight ratio of the carbon material to thiophene, calculated as the sulfur element comprised in thiophene, is 20:1-2:1; preferably, the ratio of 10:1-4:1, more preferably 8:1-4:1.

According to the process for producing a carbon-supported platinum group metal catalyst according to implementing solution II of the present invention, the operation of doping sulfur is carried out at a temperature of preferably 1100 to 1400° C., and more preferably 1200 to 1400° C.

According to the process for producing a carbon-supported platinum group metal catalyst according to implementing solution II of the present invention, the operation of doping sulfur and the operation of doping nitrogen are carried out for 1 h to 5 h, preferably 2 h to 4 h, respectively.

According to the process for producing a carbon-supported platinum group metal catalyst of implementing solution II of the present invention, the weight ratio of the carbon material to the nitrogen source, calculated as the nitrogen element comprised in the nitrogen source, is 30:1 to 1:2; preferably, the ratio of 25:1 to 1:1.5.

According to the process for producing a carbon-supported platinum group metal catalyst according to implementing solution II of the present invention, the XPS analysis of the sulfur-nitrogen doped carbon material according to the present invention shows that for $S_{2P}$ spectrum peaks between 160 ev and 170 ev, there are only characteristic peaks between 163 ev and 166 ev being present.

According to the process for producing a carbon-supported platinum group metal catalyst of implementing solution II of the present invention, the characteristic peak between 163 eV and 166 eV for the carbon-supported platinum group metal catalyst according to the present invention is bimodal peaks, and in some examples, which bimodal peaks are positioned at $163.7\pm0.5$ ev and $165.0\pm0.5$ ev, respectively.

According to the process for producing a carbon-supported platinum group metal catalyst of implementing solution II of the present invention, the carbon material may be conductive carbon black, graphene, or carbon nanotubes. The conductive carbon black may be common conductive carbon black, super conductive carbon black or extra conductive carbon black, for example, the conductive carbon black may be one or more of Ketjen black series superconducting carbon black, Cabot series Conductive carbon black and series conductive carbon black produced by EVONIK-DEGUSSA company; preferably Ketjen Black EC-300J, Ketjen Black EC-600JD, Ketjen Black ECP-600JD, VXC72, Black pearls 2000, PRINTEX XE2-B, PRINTEX L6 or HIBLAXK 40B2. The graphene or the carbon nanotube can be graphene or a carbon nanotube that is not subjected to oxidation treatment, or may be graphene or a carbon nanotube that has been subjected to oxidation treatment.

According to the process for producing a carbon-supported platinum group metal catalyst of implementing solution II of the present invention, the preparation method and the source of the conductive carbon black are not limited. The conductive carbon black can be acetylene black, furnace carbon black or the like.

According to the process for producing a carbon-supported platinum group metal catalyst of the implementing solution II, the carbon material generally has an ID/IG value of 0.8 to 5, preferably 1 to 4. In the Raman spectrum, a peak at around 1320 cm$^{-1}$ is a D peak, and a peak at around 1580 cm$^{-1}$ is a G peak, $I_D$ representing the intensity of the D peak, and $I_G$ representing the intensity of the G peak.

According to the process for producing a carbon-supported platinum group metal catalyst of implementing solution II of the present invention, the carbon material can have a resistivity of <10Ω·m, preferably <5Ω·m, and more preferably <2.0Ω·m.

According to the process for producing a carbon-supported platinum group metal catalyst according to implementing solution II of the present invention, the carbon material has an oxygen content by weight of more than 2%, such as 2% to 15%, preferably 2.5%-12%, in XPS analysis.

According to the process for producing a carbon-supported platinum group metal catalyst according to implementing solution II of the present invention, the specific surface area and pore volume of the carbon material may vary over a wide range. Generally, the specific surface area is 10 m$^2$/g to 2000 m$^2$/g, and the pore volume is 0.02 mL/g to 6 mL/g.

According to the process for producing a carbon-supported platinum group metal catalyst of implementing solution II of the present invention, in one embodiment, the carbon material in the step (1) is conductive carbon black, having a specific surface area of 200 m$^2$/g-2000 m$^2$/g.

According to the process for producing a carbon-supported platinum group metal catalyst of implementing solution II of the present invention, the inert gas may be nitrogen gas or argon gas.

According to the process for producing a carbon-supported platinum group metal catalyst of implementing solution II of the present invention, in one embodiment of the operation of doping sulfur, a carbon material is placed in a tube furnace, a carrier gas containing thiophene is introduced, the tube furnace is heated to 1000° C. to 1500° C. at a rate of 8° C./min to 15° C./min, followed by a thermostatic treatment for 0.5h to 10 h.

The carrier gas may be nitrogen gas or argon gas.

The carrier gas may comprise thiophene in an amount of 0.1%-5.0% by volume.

According to the process for producing a carbon-supported platinum group metal catalyst of implementing solution II of the present invention, the step of supporting the platinum group metal (e.g., platinum) comprises:

(a) dispersing the sulfur-nitrogen doped carbon material obtained in the step (1) and a platinum group metal precursor (such as a platinum precursor) in an aqueous phase, and adjusting the pH value to 8-12 (preferably, adjusting the pH value to 10±0.5);

(b) adding a reducing agent for reduction; and (c) separating out the solid, and subjecting to post-treatment to obtain the carbon-supported platinum group metal (e.g., carbon-supported platinum) catalyst.

According to the process for producing a carbon-supported platinum group metal catalyst of implementing solution II of the present invention, in step (a), the platinum group metal precursor (e.g., platinum precursor) is chloroplatinic acid, potassium chloroplatinate, or sodium chloroplatinate; and the concentration of the platinum group metal precursor (e.g., platinum precursor) is 0.5 mol/L to 5 mol/L.

According to the process for producing a carbon-supported platinum group metal catalyst of implementing solution II of the present invention, in the step (a), the pH of the aqueous phase is adjusted with an aqueous solution of sodium carbonate, an aqueous solution of potassium hydroxide, an aqueous solution of sodium hydroxide, or aqueous ammonia.

According to the process for producing a carbon-supported platinum group metal catalyst of implementing solution II of the present invention, in the step (b), the reducing agent is one or more selected from citric acid, ascorbic acid, formaldehyde, formic acid, ethylene glycol, sodium citrate, hydrazine hydrate, sodium borohydride, and glycerol.

According to the process for producing a carbon-supported platinum group metal catalyst of implementing solution II of the present invention, in the step (b), the molar ratio of the reducing agent to platinum is 2 to 100.

According to the process for producing a carbon-supported platinum group metal catalyst of implementing solution II of the present invention, in the step (b), the reduction is carried out at a temperature of 50° C. to 150° C., preferably 60° C. to 90° C.; for 4 to 15 hours, preferably 8 to 12 hours.

According to the process for producing a carbon-supported platinum group metal catalyst according to implementing solution II of the present invention, the sulfur-nitrogen doped carbon material produced in step (1) can be easily dispersed in an aqueous phase. However, it is difficult to disperse some carbon materials, such as Ketjen black, directly in the aqueous phase.

According to the process for producing a carbon-supported platinum group metal catalyst of implementing solution II of the present invention, the post-treatment includes: washing, filtering and drying.

Implementing solution II of the present invention also provides a process for producing a carbon-supported platinum group metal catalyst (e.g. platinum on carbon catalyst), comprising:

(1) a step of immersion of a nitrogen source: mixing a carbon material and a nitrogen source aqueous solution, and immersing, to obtain a nitrogen source-immersed carbon material;

(2) a step of producing a sulfur-nitrogen doped carbon material: treating the nitrogen source-immersed carbon material general obtained in step (1) at 1000° C.-1500° C. (preferably thermostatic treatment) in a thiophene containing inert gas for 0.5 h-10 h, to provide the nitrogen doped carbon material; and (3) a step of supporting platinum group metal (e.g. platinum) using the sulfur-nitrogen doped carbon material obtained in the step (2) as a support.

According to the process for producing a carbon-supported platinum group metal catalyst, the nitrogen source-immersed carbon material in the step (1) is dried firstly, and then the step (2) is performed.

In one embodiment of implementing solution II, the carbon-supported platinum group metal catalyst (e.g., platinum on carbon catalyst) of the present implementing solution is produced by the process for producing a carbon-supported platinum group metal catalyst (e.g., platinum on carbon catalyst).

Implementing solution II of the present invention also provides a hydrogen fuel cell using the carbon-supported platinum group metal catalyst according to any embodiment of implementing solution II of the present invention described above in an anode and/or a cathode of the hydrogen fuel cell.

In one embodiment of implementing solution II, the carbon-supported platinum group metal catalyst (e.g., a platinum on carbon catalyst) according to the present invention, when used in an oxygen reduction reaction, has a specific activity reduction by weight of <10% after 5000 cycles.

In one embodiment of implementing solution II, the carbon-supported platinum group metal catalyst (e.g., a platinum on carbon catalyst) according to the present invention, when used in an oxygen reduction reaction, in some Examples, has an ECSA>68.93 $m^2$ $g^{-1}$-Pt, such as in the range of from 60.0 $m^2$ $g^{-1}$-Pt to 100.0 $m^2$ $g^{-1}$-Pt In one embodiment of implementing solution II, the carbon-supported platinum group metal catalyst (e.g., a platinum on carbon catalyst) according to the present invention, when used in an oxygen reduction reaction, has a half-wave potential>0.890V, such as 0.89V to 0.91V in some Examples.

In one embodiment of implementing solution II, the carbon-supported platinum group metal catalyst (e.g., a platinum on carbon catalyst) according to the present invention, when used in an oxygen reduction reaction, in some Examples, has a specific activity by weight of >0.15 A $mg^{-1}$-Pt, such as 0.15 A $mg^{-1}$-Pt to 0.35 A $mg^{-1}$-Pt.

The invention obviously improves the specific activity by weight and the stability of the carbon-supported platinum group metal catalyst by doping sulfur-nitrogen on surface of the carbon support in a special form, in particular the specific activity by weight and the stability of the carbon-supported platinum group metal catalyst with high platinum supporting, compared with relatively low specific activity by weight and poor stability of the conventional carbon-supported platinum group metal for hydrogen fuel cell.

In one embodiment of implementing solution II, the carbon-supported platinum group metal catalyst according to the present invention is a platinum on carbon catalyst.

EXAMPLES

The present invention will be described in detail with reference to specific examples. The following Examples can help those skilled in the art in further understanding the present invention, but are not intended to limit the invention in any manner.

Unless otherwise specified, all reagents used in the invention are analytically pure, and all reagents are commercially available.

Implementing Solution I

Reagents, Instruments and Tests

The invention detects elements on the surface of a material by an X-ray photoelectron spectrum analyzer (XPS). The X-ray photoelectron spectrum analyzer used was an ESCALB 220i-XL type ray electron spectrometer which is produced by VG Scientific company which was equipped with Avantage V5.926 software, and the analysis and test conditions of the X-ray photoelectron spectrum analyzer were as follows: an excitation source of a monochromatized A1K α X-ray with a power of 330 W and a base vacuum of $3\times10^{-9}$ mbar for analytical testing. In addition, the electron binding energy was corrected with the C1s peak (284.3 eV) of elemental carbon, and the late peak fitting software was XPSPEAK.

Instrument, process and conditions for elemental analysis comprised: an element analyzer (Vario EL Cube), a reaction temperature of 1150° C., the sample being weighed by 5 mg, a reduction temperature of 850° C., a flow rate of carrier gas helium of 200 mL/min, a flow rate of oxygen of 30 mL/min, and oxygen being introduced for 70 s.

Instrument, process and conditions for testing the content by weight of platinum in the platinum on carbon catalyst comprised: taking 30 mg of the produced Pt/C catalyst, adding 30 mL of aqua regia, condensing and refluxing at 120° C. for 12 h, cooling to room temperature, taking the supernatant liquid for dilution, and testing the Pt content in the supernatant liquid by ICP-AES.

The high-resolution transmission electron microscope (HRTEM) used by the invention was JEM-2100 (HRTEM) (from JEOL), and the test conditions of the high-resolution transmission electron microscope comprised: an acceleration voltage of 200 kV. The particle diameter of the nanoparticles in the sample was measured by an electron microscope photo.

BET test method: in the invention, the pore structure property of a sample was measured by a Quantachrome AS-6B type analyzer, the specific surface area and the pore volume of the catalyst were obtained by a Brunauer-Emmett-Taller (BET) method, and the pore distribution curve was obtained by calculating the desorption curve according to a Barrett-Joyner-Halenda (BJH) method.

The Raman detection of the invention used a LabRAM HR UV-NIR type laser confocal Raman spectrometer produced by HORIBA company, Japan, with a laser wavelength of 532 nm.

Electrochemical performance test: instruments were Solartron analytical EnergyLab and Princeton Applied Research (Model 636A), and processes and test conditions: the polarization curve LSV of the catalyst was tested at 1600 rpm in $O_2$ saturated 0.1M $HClO_4$ and the CV curve was tested in 0.1M $HClO_4$ under Ar atmosphere to calculate the electrochemical active area ECSA. The stability was tested by scanning for 5000 cycles in the range of 0.6V to 0.95V in $O_2$ saturated 0.1M $HClO_4$, and then testing for LSV and ECSA as described above. During the test, the catalyst was produced into homogeneously dispersed slurry and coated on a glassy carbon electrode with a diameter of 5 mm, and the platinum content of the catalyst on the electrode was 3 μg-4 μg.

Resistivity test: a four-probe resistivity tester was used, instrument model KDY-1, and process and test conditions: the applied pressure was 3.9±0.03 MPa, and the current was 500±0.1 mA.

VXC72 (Vulcan XC72, produced by Kabot company, USA) was purchased from Suzhou Yilongcheng energy science and technology Co., Ltd. The results of the tests by the instrument and process above showed that: the specific surface area was 258 $m^2$/g, the pore volume was 0.388 mL/g, the oxygen content by weight was 8.72%, the $I_D/I_G$ was 1.02, and the resistivity was 1.22Ω·m Ketjenblack ECP600JD Ketjen black, produced by Lion company, Japan) was purchased from Suzhou Yilongcheng energy science and technology Co., Ltd. The results of the tests by the instrument and process above showed that: the specific surface area was 1362 $m^2$/g, the pore volume was 2.29 mL/g, the oxygen content by weight was 6.9%, the $I_D/I_G$ was 1.25, and the resistivity was 1.31Ω·m A commercial platinum on carbon catalyst (a trademark of HISPEC4000, from Johnson Matthey company) was purchased from Alfa Aesar. The test result showed that: the platinum content by weight was 40.2%.

Example 1

This Example illustrated the preparation of a nitrogen doped carbon support according to the invention.

1 g of Vulcan XC72 was immersed in 20 mL of 2.5 wt % aqueous ammonia for 24 h; dried in an oven at 100° C.; then placed into a tube furnace, heating the tube furnace to 1100° C. at a rate of 8° C./min, and a thermostatic treatment was carried out for 3 h; and naturally cooled to obtain the nitrogen doped carbon support, designated as carbon support A.

Sample Characterization and Tests

The nitrogen content by weight by XPS analysis was 1.43%; the oxygen content by weight by XPS analysis was 9.31%; the specific surface area was 239 m²/g; the resistivity was 1.28Ω·m.

FIG. 1 showed an XPS spectrum of the carbon support A of Example 1.

Example 2

This Example illustrated the preparation of a nitrogen doped carbon support according to the invention.

1 g of Vulcan XC72 was immersed in 15 ml of 0.7 wt % aqueous urea for 24 h; dried in an oven at 100° C.; then placed into a tube furnace, heating the tube furnace to 1200° C. at a rate of 10° C./min, and a thermostatic treatment was carried out for 3 h; and naturally cooled to obtain the nitrogen doped carbon support, designated as carbon support B.

Sample Characterization and Tests

The nitrogen content by weight by XPS analysis was 0.68%; the oxygen content by weight by XPS analysis was 8.92%; the resistivity was 1.25Ω·m.

Example 3

This Example illustrated the preparation of a nitrogen doped carbon support according to the invention.

10 mL of absolute ethanol was added into 1 g of Ketjen-black ECP600JD, and then 25 mL of 10 wt % aqueous ammonia was added for immersion for 24 h; dried in an oven at 100° C.; then placed into a tube furnace, heating the tube furnace to 1100° C. at a rate of 8° C./min, and a thermostatic treatment was carried out for 3 h; and naturally cooled to obtain the nitrogen doped carbon support, designated as carbon support C.

Sample Characterization and Tests

The nitrogen content by weight by XPS analysis was 1.48%; the oxygen content by weight by XPS analysis was 11.22%; the specific surface area was 1369 m²/g; the resistivity was 1.36Ω·m.

FIG. 2 showed an XPS spectrum of the carbon support C of Example 3.

Example 4

This Example illustrated the preparation of a nitrogen doped carbon support according to the invention.

10 mL of absolute ethanol was added into 1 g of Ketjen-black ECP600JD, and then 20 ml of 1 wt % aqueous urea was added for immersion for 24 h; dried in an oven at 100° C.; then placed into a tube furnace, heating the tube furnace to 1300° C. at a rate of 10° C./min, and a thermostatic treatment was carried out for 3 h; and naturally cooled to obtain the nitrogen doped carbon support, designated as carbon support D.

Sample Characterization and Tests

The nitrogen content by weight by XPS analysis was 1.31%; the oxygen content by weight by XPS analysis was 9.54%; the resistivity was 1.34Ω·m.

Example 5

The example was provided to illustrate the preparation of platinum on carbon catalyst according to the present invention.

The carbon support A was dispersed into deionized water at a ratio of 250 mL water per gram of the carbon support, 3.4 mmol of chloroplatinic acid per each gram of the carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 39.7%.

FIG. 3 showed an XPS spectrum of the platinum on carbon catalyst of Example 5.

FIG. 4 showed polarization curves before and after 5000 cycles of the platinum on carbon catalyst of Example 5.

The results of the platinum on carbon catalyst performance test were shown in Table 1.

Example 6

The example was provided to illustrate the preparation of platinum on carbon catalyst.

A platinum on carbon catalyst was produced according to the process of Example 5, except that: the carbon support B produced in Example 2 was used, and 1.3 mmol of chloroplatinic acid per gram of the carbon support was added.

Sample Characterization and Tests

The platinum content by weight of the platinum on carbon catalyst was 20.1%.

FIG. 5 showed an XPS spectrum of the platinum on carbon catalyst of Example 6.

The results of the platinum on carbon catalyst performance test were shown in Table 1.

Example 7

The example was provided to illustrate the preparation of platinum on carbon catalyst according to the present invention.

The carbon support C was dispersed into deionized water at a ratio of 250 mL water per gram of the carbon support, 12 mmol of chloroplatinic acid per each gram of the carbon support was added, ultrasonic dispersion was performed to form a suspension, and 1 mol/L of potassium hydroxide aqueous solution was added to adjust the pH value of the system to be 10; the suspension was heated to 80° C., sodium borohydride was added while stirring for reduction reaction, wherein the molar ratio of the reducer to the platinum precursor was 5:1, and the reaction was continued for 12h; the mixture obtained from the reaction was filtered, washed until the pH value of the solution was neutral, and dried at 100° C. to obtain the carbon-supported platinum catalyst.

Sample Characterization and Tests

The platinum content by weight of the platinum on carbon catalyst was 70.0%.

FIG. 6 showed an XPS spectrum of the platinum on carbon catalyst of Example 7.

The results of the platinum on carbon catalyst performance test were shown in Table 1.

Example 8

The example was provided to illustrate the preparation of platinum on carbon catalyst.

A platinum on carbon catalyst was produced according to the process of Example 7, except that: the carbon support D produced in Example 4 was used, and 1.3 mmol of chloroplatinic acid per gram of the carbon support was added.

Comparative Example 3

The platinum on carbon catalyst was a commercial catalyst purchased under the trademark of HISPEC 4000.

Sample Characterization and Tests

The platinum content by weight of the platinum on carbon catalyst was 40.2%.

FIG. 8 showed polarization curves before and after 5000 cycles of the platinum on carbon catalyst of comparative example 3.

The results of the platinum on carbon catalyst performance test were shown in Table 1.

TABLE 1

| Sample(s) | Half-wave potential/V | ECSA/ $m^2g^{-1}$-Pt | Specific activity by weight/A $mg^{-1}$-Pt | Intrinsic Activity/mA $cm^{-2}$ | Reduction of specific activity by weight after 5000 cycles/% |
|---|---|---|---|---|---|
| Example 5 | 0.92 | 74.10 | 0.255 | 0.345 | 1 |
| Example 6 | 0.91 | 87.30 | 0.440 | 0.504 | 5 |
| Example 7 | 0.88 | 55.04 | 0.114 | 0.207 | 8 |
| Example 8 | 0.91 | 135.6 | 0.311 | 0.230 | 5 |
| Comparative Example 1 | 0.89 | 33.63 | 0.135 | 0.401 | 28 |
| Comparative Example 2 | 0.83 | 62.26 | 0.086 | 0.138 | 34 |
| Comparative Example 3 | 0.88 | 57.32 | 0.124 | 0.216 | 23 |

Sample Characterization and Tests

The platinum content by weight of the platinum on carbon catalyst was 20.1%.

FIG. 7 showed an XPS spectrum of the platinum on carbon catalyst of Example 8.

The results of the platinum on carbon catalyst performance test were shown in Table 1.

Comparative Example 1

A platinum on carbon catalyst was produced according to the process of Example 5, except that: the support was Vulcan XC 72.

Sample Characterization and Tests

The platinum content by weight of the platinum on carbon catalyst was 40.1%.

The results of the platinum on carbon catalyst performance test were shown in Table 1.

Comparative Example 2

A platinum on carbon catalyst was produced according to the process of Example 7, except that: the support was Ketjenblack ECP600JD, and 200 mL water and 50 mL ethanol per gram of the carbon support were used for dispersion when supporting Pt.

Sample Characterization and Tests

The platinum content by weight of the platinum on carbon catalyst was 69.7%. The results of the platinum on carbon catalyst performance test were shown in Table 1.

Implementing Solution II

Reagents, Instruments and Tests

The invention detects elements on the surface of a material by an X-ray photoelectron spectrum analyzer (XPS). The X-ray photoelectron spectrum analyzer used was an ESCALB 220i-XL type ray electron spectrometer which is produced by VG Scientific company which was equipped with Avantage V5.926 software, and the analysis and test conditions of the X-ray photoelectron spectrum analyzer were as follows: an excitation source of a monochromatized A1K $\alpha$ X-ray with a power of 330 W and a base vacuum of $3\times10^{-9}$ mbar for analytical testing. In addition, the electron binding energy was corrected with the C1s peak (284.3 eV) of elemental carbon, and the late peak fitting software was XPSPEAK. The characteristic peaks of thiophenic sulfur and nitrogen in the spectrogram were characteristic peak after peak fitting.

Instrument, process and conditions for elemental analysis comprised: an element analyzer (Vario EL Cube), a reaction temperature of 1150° C., the sample being weighed by 5 mg, a reduction temperature of 850° C., a flow rate of carrier gas helium of 200 mL/min, a flow rate of oxygen of 30 mL/min, and oxygen being introduced for 70 s.

Instrument, process and conditions for testing the content by weight of platinum in the platinum on carbon catalyst comprised: taking 30 mg of the produced Pt/C catalyst, adding 30 mL of aqua regia, condensing and refluxing at 120° C. for 12 h, cooling to room temperature, taking the supernatant liquid for dilution, and testing the Pt content in the supernatant liquid by ICP-AES.

The high-resolution transmission electron microscope (HRTEM) used by the invention was JEM-2100 (HRTEM) (from JEOL), and the test conditions of the high-resolution transmission electron microscope comprised: an acceleration voltage of 200 kV. The particle diameter of the nanoparticles in the sample was measured by an electron microscope photo.

BET test method: in the invention, the pore structure property of a sample was measured by a Quantachrome AS-6B type analyzer, the specific surface area and the pore volume of the catalyst were obtained by a Brunauer-Emmett-Taller (BET) method, and the pore distribution curve was obtained by calculating the desorption curve according to a Barrett-Joyner-Halenda (BJH) method.

The Raman detection of the invention used a LabRAM HR UV-NIR type laser confocal Raman spectrometer produced by HORIBA company, Japan, with a laser wavelength of 532 nm.

Electrochemical performance test: instruments were Solartron analytical EnergyLab and Princeton Applied Research (Model 636A), and processes and test conditions: the polarization curve LSV of the catalyst was tested at 1600 rpm in $O_2$ saturated 0.1M $HClO_4$ and the CV curve was tested in 0.1M $HClO_4$ under Ar atmosphere to calculate the electrochemical active area ECSA. Electrochemical performance test: instruments were Solartron analytical Energy-Lab and Princeton Applied Research (Model 636A), and processes and test conditions: the polarization curve LSV of the catalyst was tested at 1600 rpm in $O_2$ saturated 0.1M $HClO_4$ and the CV curve was tested in 0.1M $HClO_4$ under Ar atmosphere to calculate the electrochemical active area ECSA. The stability was tested by scanning for 5000 cycles in the range of 0.6V to 0.95V in $O_2$ saturated 0.1M $HClO_4$, and then testing for LSV and ECSA as described above. The stability was tested by scanning for 5000 cycles in the range of 0.6V to 0.95V in $O_2$ saturated 0.1M $HClO_4$, and then testing for LSV and ECSA as described above. During the test, the catalyst was produced into homogeneously dispersed slurry and coated on a glassy carbon electrode with a diameter of 5 mm, and the platinum content of the catalyst on the electrode was 3 μg-4 μg.

Resistivity test: a four-probe resistivity tester was used, instrument model KDY-1, and process and test conditions: the applied pressure was 3.9±0.03 MPa, and the current was 500±0.1 mA.

VXC72 (Vulcan XC72, produced by Kabot company, USA) was purchased from Suzhou Yilongcheng energy science and technology Co., Ltd. The results of the tests by the instrument and process above showed that: the specific surface area was 258 $m^2$/g, the pore volume was 0.388 mL/g, the oxygen content by weight was 8.72%, the $I_D/I_G$ was 1.02, and the resistivity was 1.22Ω·m.

Ketjenblack ECP600JD Ketjen black, produced by Lion company, Japan) was purchased from Suzhou Yilongcheng energy science and technology Co., Ltd. The results of the tests by the instrument and process above showed that: the specific surface area was 1362 $m^2$/g, the pore volume was 2.29 mLg, the oxygen content by weight was 6.9%, the $I_D/I_G$ was 1.25, and the resistivity was 1.31Ω·m.

A commercial platinum on carbon catalyst (a trademark of HISPEC4000, from Johnson Matthey company) was purchased from Alfa Aesar. The test result showed that: the platinum content by weight was 40.2%.

Example II-1

The example was provided to illustrate the preparation of a sulfur-nitrogen doped carbon material.

1 g of Vulcan XC72 was immersed in 20 mL of 2 wt % aqueous ammonia for 24 h; dried in an oven at 100° C.; then placed into a tube furnace, a carrier gas (nitrogen) was fed into the tube furnace after passing through a bubbling bottle filled with thiophene, heated to 1200° C. at a rate of 10° C./min, and a thermostatic treatment was carried out for 3 h;

and naturally cooled to obtain the sulfur-nitrogen doped carbon material, designated as support A. The weight ratio of Vulcan XC72 to thiophene was 3:1, where thiophene was calculated as the sulfur contained in thiophene. The amount of thiophene was controlled by the feeding rate of the carrier gas, and the feeding rate of the carrier gas corresponding to different thiophene amounts were calibrated in advance according to the feeding duration.

Sample Characterization and Tests

I. The Sulfur-Nitrogen Doped Carbon Material

The sulfur content by weight by XPS analysis was 1.25%;

The nitrogen content by weight by XPS analysis was 0.54%; the specific surface area was 211 $m^2$/g, and the pore volume was 0.421 mL/g; the resistivity was 1.31Ω·m.

FIG. II-1 showed an XPS spectrum of sulfur in the sulfur-nitrogen doped carbon material of Example II-1.

FIG. II-2 showed an XPS spectrum of nitrogen in the sulfur-nitrogen doped carbon material of Example II-1.

Example II-2

1 g of Vulcan XC72 was immersed in 20 mL of 20 wt % aqueous ammonia for 24 h; dried in an oven at 100° C.; then placed into a tube furnace, a carrier gas (nitrogen) was fed into the tube furnace after passing through a bubbling bottle filled with thiophene, heated to 1300° C. at a rate of 10° C./min, and a thermostatic treatment was carried out for 3 h; and naturally cooled to obtain the sulfur-nitrogen doped carbon material, designated as support B. The weight ratio of Vulcan XC72 to thiophene was 9:1, where thiophene was calculated as the sulfur contained in thiophene. The amount of thiophene was controlled by the feeding rate of the carrier gas, and the feeding rate of the carrier gas corresponding to different thiophene amounts were calibrated in advance according to the feeding duration.

Sample Characterization and Tests

The sulfur content by weight by XPS analysis was 0.91%; the nitrogen content by weight by XPS analysis was 0.62%; the resistivity was 1.29Ω·m.

FIG. II-3 showed an XPS spectrum of sulfur in the sulfur-nitrogen doped carbon material of Example II-2.

Example II-3

10 mL of absolute ethanol was added into 1 g of Ketjenblack ECP600JD; then 20 ml of 20 wt % aqueous ammonia was added for immersion for 24h; dried in an oven at 100° C.; then placed into a tube furnace, a carrier gas (nitrogen) was fed into the tube furnace after passing through a bubbling bottle filled with thiophene, heated to 1200° C. at a rate of 10° C./min, and a thermostatic treatment was carried out for 3 h; and naturally cooled to obtain the sulfur-nitrogen doped carbon material, designated as support C. The weight ratio of Ketjenblack ECP600JD to thiophene was 8:1, where thiophene was calculated as the sulfur contained in thiophene. The amount of thiophene was controlled by the feeding rate of the carrier gas, and the feeding rate of the carrier gas corresponding to different thiophene amounts were calibrated in advance according to the feeding duration.

Sample Characterization and Tests

I. The Sulfur-Nitrogen Doped Carbon Material

The sulfur content by weight by XPS analysis was 0.72%; the nitrogen content by weight by XPS analysis was 1.84%; the specific surface area was 1317 $m^2$/g; the resistivity was 1.38Ω·m.

FIG. II-4 showed an XPS spectrum of sulfur in the sulfur-nitrogen doped carbon material of Example II-3.

Example II-4

The example was provided to illustrate the preparation of a sulfur-nitrogen doped carbon material.

1 g of Vulcan XC72 was immersed in 20 mL of 2 wt % aqueous ammonia for 24 h; Dried in an oven at 100° C.; then placed into a tube furnace, heated to 1200° C. at a rate of 10° C./min under protection by nitrogen gas, and a thermostatic treatment was carried out for 3 h; then, a carrier gas (nitrogen) was fed into the tube furnace after passing through a bubbling bottle filled with thiophene, and the thermostatic treatment was continued at 1200° C. for 3h; and naturally cooled to obtain the sulfur-nitrogen doped carbon material, designated as support D. The weight ratio of Vulcan XC72 to thiophene was 3:1, where thiophene was calculated as the sulfur contained in thiophene. The amount of thiophene was controlled by the feeding rate of the carrier gas, and the feeding rate of the carrier gas corresponding to different thiophene amounts were calibrated in advance according to the feeding duration.

Sample Characterization and Tests

I. The Sulfur-Nitrogen Doped Carbon Material

The sulfur content by weight by XPS analysis was 1.14%; the nitrogen content by weight by XPS analysis was 0.14%.

FIG. II-5 showed an XPS spectrum of sulfur in the sulfur-nitrogen doped carbon material of Example II-4.

Example II-5

The example was provided to illustrate the preparation of platinum on carbon catalyst according to the present invention.

The carbon support A was dispersed into deionized water at a ratio of 250 mL water per gram of the carbon support, 3.4 mmol of chloroplatinic acid per each gram of the carbon support was added, ultrasonic dispersion was performed to form a suspension, and 1 mol/L of sodium carbonate aqueous solution was added to ensure that the pH value of the system was 10; the suspension was heated to 80° C., formic acid was added while stirring for reduction reaction, wherein the molar ratio of the formic acid to the chloroplatinic acid was 50:1, and the reaction was continued for 10 hours; the mixture obtained from the reaction was filtered, washed using deionized water until the pH value of the filtrate was neutral, filtered, and dried at 100° C. to obtain the platinum on carbon catalyst.

Sample Characterization and Tests

The platinum content by weight of the platinum on carbon catalyst was 39.9%.

FIG. II-6 showed a TEM pattern of the platinum on carbon catalyst of Example II-5.

FIG. II-7 showed a polarization curve of the platinum on carbon catalyst of Example II-5.

FIG. II-8 showed an XPS spectrum of sulfur in the platinum on carbon catalyst of Example II-5.

FIG. II-9 showed an XPS spectrum of nitrogen in the platinum on carbon catalyst of Example II-5.

The results of the platinum on carbon catalyst performance test were shown in Table II-1.

Example II-6

The example was provided to illustrate the preparation of platinum on carbon catalyst according to the present invention.

A platinum on carbon catalyst was produced according to the process of Example II-5, except that: the carbon support B produced in Example II-2 was used, and 1.3 mmol of chloroplatinic acid per gram of the carbon support was added.

Sample Characterization and Tests

The platinum content by weight of the platinum on carbon catalyst was 20.3%.

The results of the platinum on carbon catalyst performance test were shown in Table II-1.

Example II-7

The example was provided to illustrate the preparation of platinum on carbon catalyst according to the present invention.

The carbon support C was dispersed into deionized water at a ratio of 250 mL water per gram of the carbon support, 12 mmol of chloroplatinic acid per each gram of the carbon support was added, ultrasonic dispersion was performed to form a suspension, and 1 mol/L of potassium hydroxide aqueous solution was added to adjust the pH value of the system to be 10; the suspension was heated to 80° C., sodium borohydride was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The platinum content by weight of the platinum on carbon catalyst was 69.8%.

FIG. II-10 showed an XPS spectrum of sulfur in the platinum on carbon catalyst of Example II-7.

FIG. II-11 showed an XPS spectrum of nitrogen in the platinum on carbon catalyst of Example II-7.

The results of the platinum on carbon catalyst performance test were shown in Table II-1.

Example II-8

The example was provided to illustrate the preparation of platinum on carbon catalyst according to the present invention.

A platinum on carbon catalyst was produced according to the process of Example II-5, except that: the carbon support D produced in Example II-4 was used.

Sample Characterization and Tests

The platinum content by weight of the platinum on carbon catalyst was 39.9%.

The results of the platinum on carbon catalyst performance test were shown in Table II-1.

Comparative Example II-1

A sulfur-nitrogen doped carbon material was produced in the same manner as in Example II-1, except that: the tube furnace was heated to 1200° C. at a rate of 3° C./min.

A platinum on carbon catalyst was produced in the same manner as in Example II-5, except that: the carbon support was the sulfur-nitrogen doped carbon material produced in the comparative example II-1.

Sample Characterization and Tests

I. The Sulfur-Nitrogen Doped Carbon Material

The sulfur content by weight by XPS analysis was 1.29%; the nitrogen content by weight by XPS analysis was 0.58%; the resistivity was 1.32Ω·m.

FIG. II-12 showed an XPS spectrum of sulfur in the sulfur-nitrogen doped carbon material of comparative example II-1.

II. Platinum on Carbon Catalyst

The platinum content by weight of the platinum on carbon catalyst was 40.1%.

FIG. II-13 showed a TEM pattern of the platinum on carbon catalyst of comparative example II-1.

FIG. II-14 shows a polarization curve of the platinum on carbon catalyst of comparative example II-1.

Comparative Example II-2

A sulfur-nitrogen doped carbon material was produced in the same manner as in Example II-1, except that: during producing the sulfur-nitrogen doped carbon material, the thermostatic treatment was carried out at a temperature of 700° C.

Sample Characterization and Tests

The sulfur content by weight by XPS analysis was 0.967%, for the sulfur-nitrogen doped carbon material of the comparative example II-2; the nitrogen content by weight by XPS analysis was 0.92%.

FIG. II-15 showed an XPS spectrum of sulfur in the sulfur-nitrogen doped carbon material of comparative example II-2.

Comparative Example II-3

The platinum on carbon catalyst was a commercial catalyst purchased under the trademark of HISPEC 4000.

Sample Characterization and Tests

The platinum content by weight of the platinum on carbon catalyst was 40.2%.

FIG. II-16 showed a polarization curve of the platinum on carbon catalyst of comparative example II-3.

Comparative Example II-4

10 mL of absolute ethanol was added into 1 g of Ketjenblack ECP600JD, and then 25 mL of 10 wt % aqueous ammonia was added for immersion for 24 h; dried in an oven at 100° C.; then placed into a tube furnace, heating the tube furnace to 1100° C. at a rate of 8° C./min, and supporting out constant temperature treatment for 3 h; and naturally cooled to obtain the nitrogen doped carbon support.

The nitrogen doped carbon support above was dispersed into deionized water at a ratio of 250 mL water per gram of the carbon support, 12 mmol of chloroplatinic acid per each gram of the carbon support was added, ultrasonic dispersion was performed to form a suspension, and 1 mol/L of potassium hydroxide aqueous solution was added to adjust the pH value of the system to be 10; the suspension was heated to 80° C., sodium borohydride was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The nitrogen content by weight by XPS analysis was 1.48%, for the nitrogen doped carbon support.

The platinum content by weight of the platinum on carbon catalyst was 70.0%.

The results of the platinum on carbon catalyst performance test were shown in Table II-1.

Comparative Example II-5

Ketjenblack ECP600JD was placed into a tube furnace, a carrier gas (nitrogen) was fed into the tube furnace after passing through a bubbling bottle filled with thiophene, heated to 1200° C. at a rate of 10° C./min, and constant temperature treatment was carried out for 3 h; and naturally cooled to obtain a sulfur doped carbon support. The weight ratio of Ketjenblack ECP600JD to thiophene was 20:1, where thiophene was calculated as the sulfur contained in thiophene. The amount of thiophene was controlled by the feeding rate of the carrier gas, and the feeding rate of the carrier gas corresponding to different thiophene amounts were calibrated in advance according to the feeding duration.

The sulfur doped carbon support above was dispersed into deionized water at a ratio of 250 mL water per gram of the carbon support, 12 mmol of chloroplatinic acid per each gram of the carbon support was added, ultrasonic dispersion was performed to form a suspension, and 1 mol/L of potassium hydroxide aqueous solution was added to allow the pH value of the system to be 10; the suspension was heated to 80° C., sodium borohydride was added while stirring for reduction reaction, wherein the molar ratio of the reducer to the platinum precursor was 5:1, and the reaction was continued for 12 h; the mixture obtained from the reaction was filtered, washed until the pH value of the solution was neutral, and dried at 100° C. to obtain the carbon-supported platinum catalyst.

Sample Characterization and Tests

The sulfur content by weight by XPS analysis was 0.76%, for the sulfur doped carbon support.

The platinum content by weight of the platinum on carbon catalyst was 70.2%.

The results of the platinum on carbon catalyst performance test were shown in Table II-1.

TABLE II-1

| Sample | Half-wave potential/V | ECSA/ $m^2$ $g^{-1}$-Pt | Specific activity by weight/A $mg^{-1}$-Pt | Intrinsic Activity/mA $cm^{-2}$ | Reduction of specific activity by weight after 5000 cycles/% |
|---|---|---|---|---|---|
| Examples II-5 | 0.91 | 68.93 | 0.203 | 0.294 | 3 |
| Examples II-6 | 0.91 | 87.30 | 0.330 | 0.378 | 5 |
| Examples II-7 | 0.89 | 92.66 | 0.184 | 0.199 | 1 |
| Examples II-8 | 0.90 | 37.98 | 0.158 | 0.417 | 3 |

TABLE II-1-continued

| Sample | Half-wave potential/V | ECSA/ $m^2$ $g^{-1}$-Pt | Specific activity by weight/A $mg^{-1}$-Pt | Intrinsic Activity/mA $cm^{-2}$ | Reduction of specific activity by weight after 5000 cycles/% |
|---|---|---|---|---|---|
| Comparative Examples II-3 | 0.88 | 57.32 | 0.124 | 0.216 | 23 |
| Comparative Examples II-4 | 0.88 | 55.04 | 0.114 | 0.207 | 8 |
| Comparative Examples II-5 | 0.89 | 95.59 | 0.181 | 0.189 | 3 |

As shown in FIGS. II-12 and II-15, the sulfur-doped carbon material not produced according to the present invention included not only a characteristic peak between 163 eV and 166 eV (which was estimated to be a characteristic peak of thiophenic sulfur by analysis), but also sulfur in an oxidized state.

As shown in Table II-1, the sulfur-nitrogen doped conductive carbon black significantly improved the ECSA and the specific activity by weight and the stability of the platinum on carbon catalyst, by comparing the Examples with the comparative example II-3.

As shown in Table II-1, by comparing Example II-7 with comparative examples II-4 and II-5, it was understood that the conductive carbon black having a characteristic peak between 163 eV and 166 eV and a single pyrrolic nitrogen simultaneously improves the overall performance of the platinum on carbon catalyst, such as specific activity by weight and stability thereof, as compared with the conductive carbon black having a characteristic peak between 163 eV and 166 eV or a single pyrrolic nitrogen.

The invention claimed is:

1. A carbon-supported platinum group metal catalyst, comprising a support and a platinum group metal in an amount of 20% to 70% by weight based on the total weight of the catalyst,
   wherein the support is a conductive carbon black doped with pyrrolic nitrogen,
   wherein, in a Nitrogen 1s ($N_{1s}$) X-ray Photoelectron Spectroscopy (XPS) spectrum of the catalyst, a characteristic peak between 399 ev and 400.5 ev is the only peak between 395 ev and 405 ev, or one or more peaks other than the characteristic peak between 399 ev and 400.5 ev accounts for less than 10% of the total peak area between 395 ev and 405 ev, and
   wherein the Nis XPS is corrected using the elemental carbon peak at 284.3 eV.

2. The carbon-supported platinum group metal catalyst according to claim 1, wherein the carbon material doped with pyrrolic nitrogen further comprises sulfur.

3. The carbon-supported platinum group metal catalyst according to claim 1, wherein, in a sulfur 2p ($S_{2P}$) XPS spectrum thereof, the peak area of peaks between 163 ev and 166 ev accounts for 92% to 100% of the total peak area of all peaks between 163 ev and 166 ev.

4. The carbon-supported platinum group metal catalyst according to claim 1, wherein the conductive carbon black is a conductive carbon black, a superconducting carbon black, or an extra conductive carbon black.

5. The carbon-supported platinum group metal catalyst according to claim 1, wherein the platinum group metal is selected from platinum (Pt), palladium (Pd), rhodium (Rh), iridium (Ir), osmium (Os), and ruthenium (Ru).

6. The carbon-supported platinum group metal catalyst according to claim 1, wherein the catalyst has a resistivity of <10Ω.

7. A hydrogen fuel cell, comprising anode and a cathode, wherein the anode, the cathode, or both comprises the carbon-supported platinum group metal catalyst according to claim 1.

8. A carbon material, comprising a conductive carbon black and nitrogen, and has a $N_{1s}$ XPS spectrum with a characteristic peak between 399 ev and 400.5 ev as the only characteristic peak between 399 ev and 400.5 eV.

9. A process for producing the carbon-supported platinum group metal catalyst, wherein the catalyst comprises a support and a platinum group metal in an amount of 20% to 70% by weight based on the total weight of the catalyst, the support being a conductive carbon black doped with nitrogen,
   wherein, in a Nitrogen 1s ($N_{1s}$) X-ray Photoelectron Spectroscopy (XPS) spectrum of the catalyst, a characteristic peak between 399 ev and 400.5 ev is the only peak between 395 ev and 405 ev, or one or more peaks other than the characteristic peak between 399 ev and 400.5 ev accounts for less than 10% of the total peak area between 395 ev and 405 ev, and wherein the $N_{1s}$ XPS is corrected using the elemental carbon peak at 284.3 eV,
   the process comprising the steps of:
   (1) a step of immersion of a nitrogen source: mixing a carbon material and an aqueous solution containing a nitrogen source, and immersing, to obtain a nitrogen source-immersed carbon material;
   (2) a step of producing a nitrogen doped carbon material: heating the nitrogen source-immersed carbon material obtained in the step (1) to 1000° C.-1500° C. in an inert gas at a temperature-rising rate of 8° C./min-15° C./min, followed by a thermostatic treatment for 0.5h-10 h, to obtain the nitrogen doped carbon material; and
   (3) a step of supporting the platinum group metal: disposing the platinum group metal on the nitrogen doped carbon material obtained in the step (2),
   wherein the step of supporting the platinum group metal comprises:
   (a) dispersing the nitrogen doped carbon material obtained in the step (2) and a platinum group metal precursor in an aqueous phase to form a mixture, and adjusting the pH value of the mixture to 8-12;
   (b) adding a reducing agent to the mixture for reduction; and
   (c) separating a solid from the mixture, and subjecting the solid to post-treatment to obtain the platinum on carbon catalyst, and
   wherein the carbon material is a conductive carbon black.

10. The process according to claim 9, wherein the thermostatic treatment is carried out at a temperature of 1150° C. to 1450° C.

11. The process according to claim 9, wherein the nitrogen source is aqueous ammonia or urea.

12. The process according to claim 9, wherein a weight ratio of the carbon material to the nitrogen source, calculated based on elemental nitrogen in the nitrogen source, is 30:1 to 1:2.

13. The process according to claim 9, wherein the carbon material has an oxygen content by weight of more than 4%, based on XPS analysis.

14. The process according to claim 9, wherein the platinum group metal precursor is chloroplatinic acid, potassium chloroplatinate, or sodium chloroplatinate; and the concentration of the platinum group metal precursor in the aqueous solution is 0.5 mol/L-5 mol/L.

15. The process according to claim 9, wherein the reducing agent is selected from the group consisting of citric acid, ascorbic acid, formaldehyde, formic acid, ethylene glycol, sodium citrate, hydrazine hydrate, sodium borohydride and glycerol; the molar ratio of the reducing agent to the platinum is 2-100; and the reduction step is carried out at a temperature of 50° C.-150° C. for 2h-15 h.

16. The carbon-supported platinum group metal catalyst according to claim 1, wherein the pyrrolic nitrogen on the conductive carbon black and the $N_{1s}$ XPS spectrum of the catalyst is free of peaks between 395 ev and 405 ev other than the characteristic peak between 399 ev and 400.5 ev that is characteristic of pyrrolic nitrogen.

* * * * *